US007474987B2

(12) United States Patent
Subrahmanian et al.

(10) Patent No.: US 7,474,987 B2
(45) Date of Patent: Jan. 6, 2009

(54) METHOD AND SYSTEM FOR OPTIMAL DATA DIAGNOSIS

(75) Inventors: V. S. Subrahmanian, Potomac, MD (US); Jason Ernst, Silver Spring, MD (US)

(73) Assignee: University of Maryland, College Park, MD (US)

( * ) Notice: Subject to any disclaimer, the term of this patent is extended or adjusted under 35 U.S.C. 154(b) by 876 days.

(21) Appl. No.: 10/774,516

(22) Filed: Feb. 10, 2004

(65) Prior Publication Data

US 2005/0177482 A1     Aug. 11, 2005

(51) Int. Cl.
*G06F 15/00*     (2006.01)
(52) U.S. Cl. .................. 702/184; 702/183; 700/26; 700/83
(58) Field of Classification Search .......... 702/81, 702/84, 183–185; 705/35, 38; 709/217, 709/223; 706/20, 45; 714/4; 700/83, 95, 700/26
See application file for complete search history.

(56) References Cited

U.S. PATENT DOCUMENTS

| 5,383,133 A * | 1/1995 | Staple .................. 700/280 |
| 2004/0010375 A1 * | 1/2004 | Schomacker et al. .......... 702/19 |

OTHER PUBLICATIONS

Agrawal, R., et al., "Mining Association Rules between Sets of Items in Large Databases", Proceedings of the 1993 ACM SIGMOND International Conference on Management of Data, pp. 207-216, 1993.
Aumann, Y., et al., "A statistical theory for quantitative association rules", Proceedings of the fifth ACM SIGKDD International Conference on Knowledge Discovery and Data Mining, pp. 261-270, ACM Press, 1999.
Bayardo, R., et al., "Mining the most interesting rules", Proceedings of the fifth ACM SIGKDD International Conference on Knowledge Discovery and Data Mining, pp. 145-154, ACM Press, 1999.
Bayardo, R., et al., "Constraint-Based Rule Mining in Large, Dense Databases", Proceedings of the 15th International Conference on Data Engineering, pp. 188-197, IEEE Computer Society Press, Mar. 23-26, 1999.
Brin, S., et al., "Beyond Market Baskets: Generalizing Association Rules to Correlations", SIGMOD 1997, Proceedings ACM SIGMOD International Conference on Mangement of Data, pp. 265-276, May 13-15, 1997.

(Continued)

*Primary Examiner*—John H Le
(74) *Attorney, Agent, or Firm*—Rosenberg, Klein & Lee

(57) ABSTRACT

In the method and system for automated data diagnosis, a relational data base is formed of attributes characterizing an entity. The framework computes optimal diagnosis for a diagnostic inference problem which separates the desirable attributes from the undesirable attributes. The user of the system is permitted to specify certain parameters based on which the system computes a set of optimal or near optimal association rules between the attributes of a specific process, product, or other entity. The system and method of the present invention considers the simplicity of conditions in addition to support and confidence when ordering them, contributes the notion of tight conditions and semi-equivalence to remove redundant rules, uses the concept of the top fringes which allows near optimal conditions to be found, in addition to optimal conditions. Numeric as well as non-numeric attributes can be analyzed.

22 Claims, 6 Drawing Sheets

OTHER PUBLICATIONS

Brin, S., et al., "Mining Optimized Gain Rules for Numeric Attributes", Proceedings of the fifth ACM SIGKDD International Conference on Knowledge Discovery and Data Mining, pp. 135-144, ACM Press, 1999.

Fukuda, T., et al., "Data mining using two-dimensional optimized association rules: scheme, algorithms, and visualization", ACM SIGMOD Record, vol. 25, Issue 2, pp. 13-23, ACM Press, 1996.

Miller, R., et al., "Association rules over interval data", Proceedings of the 1997 ACM SIGMOD international conference on Management of Data, pp. 452-461, ACM Press, 1997.

Rastogi, R., et al., "Mining optimized support rules for numeric attributes", Proceedings of the 15th International Conference on Data Engineering, pp. 126-135, IEEE Computer Society Press, Mar. 1999.

Srikant, R., et al., "Mining Quantitative Association Rules in Large Relational Tables", Proceedings of the 1996 ACM SIGMOD International Conference on Management of Data, pp. 1-12, ACM Press, 1996.

* cited by examiner

METHOD AND SYSTEM FOR OPTIMAL DATA DIAGNOSIS

FIELD OF THE INVENTION

The present invention relates to a technique for computing optimal diagnosis for inference problems associated with various applications; and more particularly, the present invention relates to diagnostic inference problems associated with various applications such as fault diagnosis of manufacturing lines for any product, analyzing credit risk for banks, mortgage and credit card companies, analyzing potential insurance fraud, analyzing bank accounts for illicit activities such as money laundering, illegal international transfers, etc.

More in particular, the present invention pertains to a method and system for finding an optimal set of data association rules in automated data diagnosis of the data characterizing an entity.

In overall concept, the present invention relates to a method of analysis of relational data bases associated with numerous manufacturing, financial, medical, etc. applications where a relational data base includes various measured parameters of the application for determining whether the results of the application are desirable or not and where the conditions are inferred on the measurement which separate the desirable results from the undesirable ones.

BACKGROUND OF THE INVENTION

Various applications exist wherein a plurality of aspects of a process are measured and determined whether the result of the process is desirable or not. Such applications may include fault diagnosis of manufacturing lines for any product, analyzing credit risk for banks, mortgage, and credit card companies, analyzing potential insurance fraud, analyzing bank accounts for illicit activity such as money laundering, illegal International transfers, etc. In such applications, it is useful to infer conditions on the measurements (or other parameters of the application) that separate out the desirable results from the undesirable ones. These kinds of problems are called diagnostic inference problems. The ability to perform this inference often results in corrective actions that increase the probability of obtaining a desirable result.

In numerous applications, relational data bases record information about a domain. A relational data base, as known to those skilled in the art, is a data base which stores all its data within tables. All operations on data are conducted in the tables themselves or alternatively, a resulting table is produced. Each such table is a set of rows and columns described in J. D. Ullman, Principles of Data Base and Knowledge Base Systems, Computer Science Press, 1989.

In the relational data bases associated with applications, the data base tuples, which are the rows of the data base are used to record information about a particular entity. While the columns of the data base, represent the attributes, which are specific parameters of the analyzed entity. In order to separate out the rows with desirable results from the undesirable results, specific association rules are established which are applied to the relational data base of the application domain. The association rules are rules presentable in the form of $C1 \rightarrow C2$, where C1 and C2 are conditions that are used to determine whether the entity is desirable and where the condition C2 is not necessarily fixed.

The problem of association rule mining was first introduced in R. Agrawal, T. Imielinski, A. Swami, "Mining Association Rules Between Sets of Items in Large Databases", In Proc. of ACM SIGMOD, 1993, pp. 207-216. The work was limited only to non-numeric data, and all association rules were found that exceed specified criterion such as lower bounds for support and confidence.

The body of work on association rules is extensive, and many aspects of the issue have been developed over the years. For example, in R. Srikant and R. Agrawal, "Mining Quantitative Association Rules in Large Relational Tables", In Proc. of ACM SIGMOD, pp. 1-12, 1996, a framework was introduced which was designed to find association rules in data sets that include numeric attributes. The authors present concepts of k-completeness and interest, which are used to reduce the number of rules that need to be considered explicitly and to eliminate redundant rules.

The primary weakness of the framework, however, is that as with R. Agrawal, et al. (supra), the framework relies just on the support and confidence lower bounds to determine which rules to select. Relying simply on support and confidence lower bounds poses problems of an excessive number of rules being returned for analysis, as well as the possibility of not returning a rule of interest if the bounds are not made too high.

A further critique of frameworks that rely just on support and confidence lower bounds has been presented in S. Brin, R. Motwani, and C. Silverstein, "Beyond Market Baskets: Generalizing Association Rules to Correlations"; in Proc. of ACM SIGMOD, pp. 265-276, 1997. R. Srikant and R. Agrawal, "Mining Quantiative Association Rules in Large Relational Tables"; as well as in Proc. of ACM SIGMOD, pp. 1-12, 1996. However, these papers do not address the issue of the simplicity of rules.

The paper of R. J. Bayardo, R. Agrawal, D. Gunopulos, "Constraint-based Rule Mining in Large, Dense Databases". In Proc. of ICDE, pp. 188-197, 1999 presents a framework that addresses the issue of rule simplicity. The paper proposes a notion of a rule improvement constraint, in which a more complicated rule is not returned if its improvement over a simpler rule is small. However the framework only applies to non-numeric data, and again relies heavily on support and confidence lower bounds.

Two other frameworks of note are Y. Aumann and Y. Lindell: "A Statistical Theory for Quantitative Association Rules". In Proc. of ACM SIGKDD, pp. 261-270, 1999 and R. J. Miller and Y. Yang. "Association Rules Over Interval Data". In Proc. of ACM SIGMOD, pp. 452-461, 1997 address finding association rules for numeric data. Neither framework uses the traditional definitions of support and confidence of rules, but both frameworks rely heavily on constraints to determine which rules to return.

Another approach to association rule mining is to find those rules that are optimal or near optimal according to some criteria. Representative papers in this area include S. Brin, S. R. Rastogi, and K. Shim. "Mining Optimized Gain Rules for Numeric Attributes". In Proc. of ACM SIGKDD, pp. 135-144, 1999; T. Fukuda, Y. Morimoto, S. Morishita, and T. Tokuyama. "Data Mining Using Two-Dimensional Optimized Association Rules: Scheme, Algorithms, and Visualization". In Proc. of ACM SIGMOD, pp. 13-23, 1996, and R. Rastogi, K. Shim "Mining Optimized Support Rules for Numeric Attributes". In Proc. of ICDE, pp. 126-135, 1999. These papers study ways to efficiently find optimal association rules according to measures such as gain, support, and confidence in certain restricting settings.

Another paper dealing with optimal association rule mining, presents a partial ordering for association rules based on support and confidence. This framework is however disadvantageous in that it fails to consider the simplicity of conditions or to remove redundant rules. In addition, the framework is limited only to non-numeric attributes.

It would therefore be highly desirable to have a technique for optimal association rules mining which is applicable to both numeric and non-numeric attributes, and which would consider the simplicity of conditions in addition to support and confidence as well as to optimize efficiency by removing redundant rules. It also would be highly desirable that this technique would involve mining not just of one rule at a time, but mining of a set of k rules for some number k.

SUMMARY OF THE INVENTION

It is therefore an object of the present invention to provide a technique for separating in the most effective and least time consuming manner the desirable conditions from the undesirable conditions in relational databases associated with applications in many areas of human activity.

It is another object of the present invention to provide a method and system for automated data diagnosis associated with relational databases, where a plurality of criteria are taken into consideration for the separation of the desirable and undesirable conditions in order to find near optimal conditions in addition to optimal conditions, and wherein the redundant rules are removed during the process of automated data diagnosis.

It is a further object of the present invention to provide a method and system for automated data diagnosis in which the simplicity of conditions is considered along with support and confidence of the conditions.

It is still another object of the present invention to provide a method which is applied both to numeric and non-numeric attributes in relational databases for computing the optimal association rules.

According to the teachings of the present invention, a method for automated data diagnosis is provided which results in an optimal set of association rules for data characterizing an entity. The method includes the steps of:

establishing a computer system for automated data diagnoses; and creating a relation R containing the data $A=(A_1, \ldots, A_n, A_{n+1}, \ldots A_{n+m})$, where n, m≧1. The data characterize the entity to be diagnosed which may be a product or a process in basically any application of human activity.

The data A is represented by outcome attributes $A_{n+1}, \ldots A_{n+m}$ and diagnosable attributes $A_1, \ldots A_n$, where the outcome attributes determine whether the entity is desirable or not, and the diagnosable attributes determine the reasoning of why the entity is desirable or not. The outcome and the diagnosable attributes in the relation R may be numeric as well as non-numeric attributes.

Further, a user specifies to the computer system an outcome condition (D) which is a selection condition which includes strictly outcome attributes selected from the $A_{n+1}, \ldots A_{n+m}$ attributes and specifies at least one diagnosable selection condition C which includes diagnosable attribute selected by the user from the $A_1, \ldots A_n$ attributes.

The user also specifies a "simpler-than" ordering (≧simpler) criterion, which includes a set of the diagnosable selection conditions C which are simpler than a predetermined diagnosable selection condition. Additionally, the user specifies to the computer system a Data Diagnosis Objective (DDO) by defining the following components of the DDO:

(a) evaluation domain (ED) providing for measurement of quality of the diagnosable selection conditions, (b) a partial ordering (⊆) of the evaluation domain, specifying which diagnosable selection condition in the evaluation domain are better than others, and (c) a mapping function f that maps the diagnosable selection conditions to the evaluation domain, such that $C_1 > C_2 \Rightarrow f(C_2) \subseteq f(C_1)$, wherein $C_1$ and $C_2$ are diagnosable selection conditions. Arbitrary metrics may be applied to the DDO for comparing diagnosable selection conditions. Metrics that can be used include standard ones such as chi-squared value, confidence, conviction, entropy gain, laplace, lift, gain, gini, and support.

The method further contemplates the steps of:

specifying a semi-equivalence relation Δ on the diagnosable selection conditions to determine similarity thereof;

specifying selection condition constraints S for the diagnosable selection conditions to meet where the selection condition constraints include minimal acceptable confidence, minimal acceptance support and maximum order of said diagnosable selection condition;

specifying to the computer system a number of fringes of interest, $F^0, F^1 \ldots$, wherein the fringe $F^0$ represents a best possible selection conditions with regard to a combination of respective said specified support, the specified confidence and the specified "simpler-than" ordering the fringe $F^1$ represents the set of diagnosable selection conditions that are worse only the fringe $F^0$, and the fringe $F^{i+1}$ represents the set of diagnosable selection conditions that are worse than fringe $F^i$;

computing said optimal fringes $F^0, F^1, \ldots F^i, F^{i+1}$, and computing a compact set of the optimal fringes to eliminate redundant conditions, said compact set representing the optimal set of data association rules.

A subset SF of said set F of the optimal fringes is defined as the compact representation of the set F with regard to the Δ, if:

a. for each diagnosable selective condition sc∈F, ∃sc'∈CF such that scΔsc';

b. if sc∈F and sc∉CF, then ∃sc'∈CF such that scΔsc' ∧( ¬(f(sc')⊆f(sc) ∨(f(sc')=f(sc))); and c. there is no strict subset CF' of CF satisfying said conditions (a) and (b).

The diagnosable conditions C are combined to form a diagnosable selection condition SC; and the diagnosable selection conditions SC are restricted to tight diagnosable selection conditions T, wherein the diagnosable selection condition SC is tight if for each diagnosable selection $l \leq A_i \leq u$ in the diagnosable selection condition SC, $(\sigma_{(Ai=l)} \wedge_{SC} \wedge_D(R) \neq 0) \wedge (\sigma_{(A_i=u)} \wedge_{SC} \wedge_D(R) \neq 0)$ where σ is a relational selection operator, wherein $A_i$ is a diagnosable attribute, and l, U∈dom($A_i$) are values defined by the user.

Preferably, for computing the optimal fringes, a condition graph is created by enumerating a set of tight selection conditions T satisfying the selection condition constraints, and support and confidence defined by the user are evaluated.

In the method of the present invention, the fringes are defined independent of the DDO. A plurality of distinct DDOs can be applied to the set of fringes without recomputing the set of fringes.

The semi-equivalence relations Δ may be a distance-based relation or an attribute distance threshold based semi-equivalence relation or other relations. The semi-equivalence relation is specified by defining $L_{CA}$ and $U_{CA}$ to be the lower and upper bounds, respectively, of a respective diagnosable attribute A in said diagnosable condition C, and defining a diagnosable selective condition $C_1$ as semi-equivalent to a diagnosable selective condition $C_2$ if:

a. the set of diagnosable attributes appearing in the $C_1$ is equivalent to the set of diagnosable attributes appearing in the $C_2$;
b. for each numeric diagnosable attribute, A, appearing in the $C_1$ and the $C_2$ $$d(L_{C_{1_A}}, L_{C_{2_A}}) \leq \epsilon_A$$
$$d(U_{C_{1_A}}, U_{C_{2_A}}) \leq \epsilon_A$$

where the $\epsilon_A$ values are constants that differ based on the diagnosable attribute A; and/or
c. for each non-numeric attribute, A, appearing in $C_1$ and $$L_{C_{1_A}} = L_{C_{2_A}}.$$

Further the present invention is directed to a system for automated data diagnosis which includes a computer;
means in said computer system for storing data to be diagnosed, the data characterizing an entity,
means for forming a relation R containing the data to be diagnosed,
means for creating a relation R containing the data characterizing the entity $A=(A_1, \ldots A_n, A_{n+1}, \ldots A_{n+m})$, where n, m$\geq$1, (the data are represented by outcome attributes $A_{n+1}, \ldots A_{n+m}$ and diagnosable attributes $A_1, \ldots A_n$, the outcome attributes determining whether the entity is desirable or not, and the diagnosable attributes determining the reason of why the entity is desirable or not);
an interface for communication between a user and the computer, the user inputting into said computer a plurality of selective conditions through the interface, and
means in the computer for computing optimal data association rules for the data to be diagnosed based on the selective conditions, wherein a combination of a confidence, support and simplicity of the selective conditions is considered.

DESCRIPTION OF THE PREFERRED EMBODIMENTS

Figure 1:
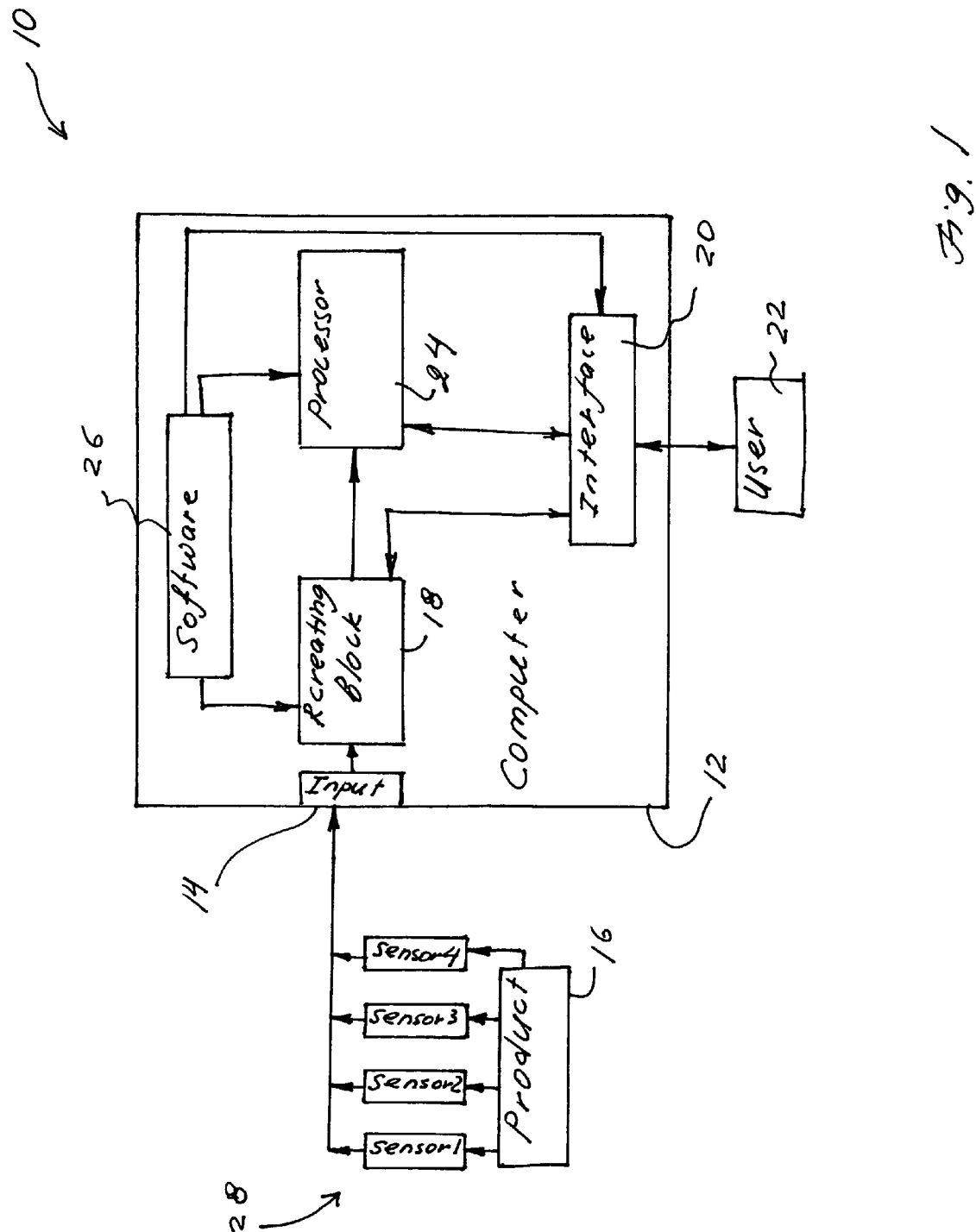
FIG. 1 is a schematic block-diagram of the system for automated data diagnosis of the present invention.

Relational databases are used to record information about a domain in numerous applications. In further description of the present invention, three application examples are used including a Manufacturing Example, a Loan Default Prediction Example, and a Census Example for sake of clarity and ease of understanding of the principles of the present invention. However, as will be understood by those skilled in the art, these examples are not directed to limiting the scope of the method and system of the present invention but used for clarification purposes only. Other applications in various fields of endeavor may be considered as well. In different applications, including those used as an example and described infra, the relational database tuples, which are the rows of the database, are used to record information about a particular entity (for example, a product of a process). In the technique of the present invention, the attributes, that are the columns of the database, are split into two parts—outcome attributes, and diagnosed attributes. Outcome attributes are the attributes that may be used to determine whether an entity is desirable or not, while diagnosed attributes are used to determine why some entities are desirable while others are not.

1.1 MANUFACTURING EXAMPLE

In the Manufacturing example, a manufactured product P represents an entity considered for data diagnosis. P may be something as simple as a coffee mug, as complex as an LCD device (or other device). For each item of the product P manufactured, sensors may record various aspects of the product as it moves along the production line from the raw materials stage to the finished product (or part thereof). Each of these sensor readings, together with an "ItemId" attribute, may correspond to a diagnosed attribute. At the end of manufacturing process, quality control inspectors inspect the resulting product and either assign it 0 (i.e., passed inspection) or a defect code number (specifying a certain type of defect). This finding can then be represented in a Table as the outcome attribute "Inspection". An example Table of this kind is represented as Table 1.

TABLE 1

| ItemId | Sensor1 | Sensor2 | Sensor3 | Sensor4 | Inspection |
|--------|---------|---------|---------|---------|------------|
| 1 | 10 | 5 | 32 | 9 | 0 |
| 2 | 9 | 6 | 30 | 8 | 0 |
| 3 | 34 | 5 | 45 | 9 | 22 |
| 4 | 9 | 6 | 31 | 8 | 0 |
| 5 | 11 | 6 | 32 | 8 | 0 |
| 6 | 10 | 7 | 31 | 9 | 0 |
| 7 | 36 | 6 | 46 | 8 | 14 |
| 8 | 9 | 6 | 32 | 9 | 0 |
| 9 | 11 | 7 | 33 | 8 | 0 |

In this example, the schema has only one outcome attribute, viz. Inspection, while all the other attributes (readings of sensors 1-4) are diagnosable attributes.

1.2 Loan Default Prediction

In the Loan Default Prediction example, a bank that is interested in determining what kinds of loans will default is considered for data diagnosis. Such a bank may use various parameters in measuring data, but for the purposes of an expository example, only a few are listed in the Table 2.

TABLE 2

| Name | YPresAdd | YPresEmpl | YPrevEmpl | Income | LPay | Age | Dep | Default |
|---|---|---|---|---|---|---|---|---|
| Jennifer Brown | 1 | 2 | 1 | 7900 | 600 | 27 | 0 | 0 |
| Jim Burk | 4 | 4 | 5 | 6700 | 1500 | 39 | 1 | 0 |
| Brian Davis | 12 | 9 | 9 | 5700 | 1500 | 44 | 1 | 0 |
| John Doe | 8 | 10 | 6 | 7500 | 2000 | 41 | 2 | 0 |
| Lisa Johnson | 9 | 7 | 6 | 8700 | 3000 | 48 | 2 | 0 |
| Mike Jones | 7 | 9 | 5 | 7700 | 100 | 43 | 3 | 0 |
| Jane Shady | 3 | 1 | 1 | 2000 | 1500 | 37 | 1 | 1 |
| Dan Smith | 6 | 2 | 2 | 3000 | 250 | 32 | 1 | 1 |
| Melissa Williams | 11 | 5 | 7 | 4500 | 750 | 42 | 2 | 1 |

The columns in the Table 2 stand for name, years at present address, years at present employment, years at previous employment, monthly income, monthly loan payment, age, number of dependents, and whether or not the individual defaulted (1 indicates they did default, 0 indicates they did not).

Over the years, the bank may have accumulated a large set of data concerning loans they have made. Each such loan account may be described as a row in a table such as the Table 2. In such an application, conditions on the columns (ignoring the Name column) are to be found that separate out loans to default from ones which will not as is this clearly has an impact on the bank's planning. In this application, all attributes, except for the Name and Default columns, will be used as diagnosable attributes.

These are just two examples—in different markets—of how diagnostic inference can be extremely important to corporations. The Manufacturing example applies to virtually all manufactured products, ranging from paper cups to sophisticated airplane electronics. Likewise, the Loan Default Prediction example may be applied to a variety of other financial applications such as credit card default and commercial bankruptcy predictions.

The following example presented infra herein is based on a real data set. The data comes from the adult data set, also known as the census income data set, on the UCI machine learning repository, C. L. Blake and C. J. Merz. UCI Repository of Machine Learning Databases. http://www.ics.uci.edu/~mlearn/MLRepositorv.html. Irvine, Calif.: University of California, Department of Information and Computer Science, 1998. The data consists of 32,561 tuples. Each tuple is broken down into 1 outcome attribute and 11 diagnosed attributes. Of the 11 diagnosed attributes, 5 are numeric and 6 are non-numeric.

1.3 Census

In the Census example, a set of data is considered for the diagnosis, which contains a Boolean outcome attribute, "Income", which indicates whether or not an individual makes more than $50,000 a year, and the following 11 diagnosed attributes, as shown in Table 3.

TABLE 3 age: numeric - [17, 90]
workclass: non-numeric - {Federal-gov, Local-gov, Never-worked, Private, Self-emp-inc, Self-emp-not-inc, State-gov, Without-pay}
education: numeric - {1 (Preschool), 2 (1st-4th), 3 (5th-6th), 4 (7th-8th), 5 (9th), 6 (10th) 7 (11th), 8 (12th), 9 (HS-grad), 10 (Some-college), 11 (Assoc-voc), 12 (Assoc-acdm), 13 (Bachelors), 14 (Masters), 15 (Prof-school), 16 (Doctorate)
marital-status: non-numeric - {Divorced, Married-AF-spouse, Married-civ-spouse, Married-spouse-absent, Never-married, Separated, Widowed}
occupation: non-numeric - {Adm-clerical, Armed-Forces, Craft-repair, Exec-managerial, Farming-fishing, Handlers-cleaners, Machine-op-inspct, Other-service, Priv-house-serv, Prof-specialty, Protective-serv, Sales, Tech-support, Transport-moving}
relationship: non-numeric - {Husband, Not-in-family, Other-relative, Own-child, Unmarried, Wife}
sex: non-numeric - {Female, Male}
capital-gain: numeric - {0, 99999}
capital-loss: numeric - [0, 4356]
hours-per-week: numeric - [1, 99]
native-country: non-numeric - {Cambodia, Canada, China, Columbia, Cuba, Dominican-Republic, Ecuador, El-Salvador, England, France, Germany, Greece, Guatemala, Haiti, Holland-Netherlands, Honduras, Hong, Hungary, India, Iran, Ireland, Italy, Jamaica, Japan, Laos, Mexico, Nicaragua, Outlying-US (Guam-USVI, etc), Peru, Philippines, Poland, Portugal, Puerto-Rico, Scotland, South, Taiwan, Thailand, Trinadad & Tobago, United States, Vietnam, Yugoslavia In the Table 3, age contains the individual's age; workclass contains the census code for the class of workers to which the individual belongs; education contains the highest level of schooling an individual has obtained on a scale of 1 to 16; occupation contains the census code for the occupation of the individual; capital-gain and capital-loss contain the capital gains and losses the individual incurred during a year period respectively; hours-per-week contains the number of hours an individual works on average; native-country contains the native country of the individual.

An example of a goal may be to find a set of conditions to understand what types of people earn more than $50,000 a year. The following is one such possible set of conditions that can be generated via the framework for diagnostic inference of the present invention applied to the census data set: {$7688 \leq$ capital-gain$\leq 20051$, $3103 \leq$ capital-gain$\leq 9999$, workclass=Self-emp-inc, occupation=Exec-managerial, $12 \leq$ education-num$\leq 16$, relationship=Husband, maritalstatus=Married-civ-spouse, $26 \leq$ age$\leq 75$, race=White, native-country=United States, 2≦education-num≦16, relationship=Wife, occupation=Prof-specialty, 37≦age≦59, sex=Male}.

For example, the inclusion of 12≦education-num≦16 in the set can be interpreted as a partial explanation as to why someone is able to earn more than $50,000 a year is the fact that they hold an advanced degree. One should recognize that the number of conditions that may be included in the set is enormous. The method of the present invention permits to narrow the set of conditions to the fifteen that appear supra.

The process of narrowing the enormous space of conditions is the core of automated data diagnosis of the present invention, to provide the efficient and the least time consuming computation of the diagnostic inference problem.

It is important to note that the method of the present invention applies to any relation, R, where the attributes can be split into a set of diagnosed attributes and a set of outcome attributes. The goal of the process is to specify and compute an optimal set of conditions on the diagnosable attributes of R for an outcome condition D. In the framework of the present invention, a selection condition will be more likely to appear in the optimal set if:

the accuracy of the condition is high;
the number of tuples that supports the validity of the condition is high;
the condition is relatively simple; and
the condition is not similar to other "desirable" conditions.

The framework of the present invention for diagnostic inference has been designed to meet the following criteria:

1. The framework should handle numeric as well as non-numeric attributes;
2. By varying a parameter a user should be able to vary the number of conditions returned;
3. Any condition that is not returned, but satisfies all constraints, must be very similar to a condition that is returned, or alternatively strictly worse than a specified number of other conditions according to any reasonable objective measure of the "goodness" of conditions (including measures that take into account the simplicity of conditions);
4. The set of conditions returned should not have many more conditions beyond that which is required to ensure the previous item; and
5. No two conditions which are essentially the same should be returned.

The framework of the present invention achieves all five of the above criteria.

In the following description, the definitions presented infra are used.

It is assumed that there is a relation R over schema A= $(A_1, \ldots, A_n, A_{n+1}, \ldots A_{n+m})$, where $n, m \geq 1$, attributes $A_1, \ldots, A_n$ are the diagnosed attributes, and $A_{n+1}, \ldots A_{n+m}$ are the outcome attributes. Each attribute $A_i$ has an associated domain, $dom(A_i)$. There is no loss of generality in making these assumptions.

Definition 2.1 (outcome condition (OC)) Suppose R is a relation as assumed supra. An outcome condition D is any selection condition that only involves outcome attributes.

EXAMPLE 2.1

Manufacturing Example 1.1 Revisited

Returning to the Manufacturing example 1.1, two possible outcome conditions that one may want to use are Inspection=14 and Inspection≠0.

EXAMPLE 2.2

Loan Default Prediction Example 1.2 Revisited

Returning to the loan default prediction example 1.2, a possible outcome condition that one may want to use is Default=1.

EXAMPLE 2.3

Census Example 1.3 Revisited

Returning to the census example 1.3, the outcome condition used is Income=true, where Income=true means an individual earns more than $50,000 a year.

Definition 2.2 (atomic diagnosable condition) If $A_i$ is a diagnosable attribute and $l, u, \in dom(A_i)$ are values, then $l \leq A_i \leq u$ is called an atomic diagnosable condition. If $l=u$, then we will also use $A_i=l$ to denote $l \leq A_i \leq u$.

All attributes can be either numeric or non-numeric; if $A_i$ in the above definition is a non-numeric attribute, then it must be the case that $l=u$.

EXAMPLE 2.4

Manufacturing Example 1.1 Revisited

In the manufacturing example 1.1 $34 \leq Sensor1 \leq 36$ and $Sensor2=6$ are both examples of atomic diagnosable conditions.

EXAMPLE 2.5

Loan Default Prediction 1.2 Revisited

In the loan default prediction example 1.2 $4500 \leq Income \leq 4700$ provides an example of an atomic diagnosable condition.

EXAMPLE 2.6

Census Example 1.3 Revisited

In the census example 1.3 occupation=Exec-managerial provides an example of an atomic diagnosable condition.

Diagnosable conditions can be combined to form a diagnosable selection condition which is defined infra.

Definition 2.3 (diagnosable selection condition)
1. Every atomic diagnosable condition is a diagnosable selection condition.
2. If $sc_1$, $sc_2$ are diagnosable conditions, then $sc_1 \wedge sc_2$ is a diagnosable selection condition.

In the method of the present invention, the attention is restricted to a special type of diagnosable selection conditions, which is called tight diagnosable selection conditions.

Definition 2.4 (tight diagnosable selection condition) Suppose R is a relation instance over schema A and D is an OC. A diagnosable selection condition sc is tight iff for each atomic diagnosable condition $l \leq A_i \leq u$ in sc, $(\sigma_{(A_i=l) \wedge sc \wedge D}(R) \neq 0) \wedge (\sigma_{(A_i=u) \wedge sc \wedge D}(R) \neq 0)$ where $\sigma$ is the standard relational selection operator (J. D. Ullman. Principles of Database and Knowledge Base Systems, Computer Science Press, 1989).

Intuitively, a tight diagnosable selection condition is a diagnosable selection condition in which a tuple satisfying the outcome condition occurs on every boundary of the region described by the diagnosable selection condition.

The following examples show some sample tight diagnosable selection conditions.

EXAMPLE 2.7

Manufacturing Example 1.1 Revisited

Sensor1=36 ∧Sensor2=6 is an example of a tight diagnosable selection condition for an OC of Inspection=14.

EXAMPLE 2.8

Loan Default Prediction Example 1.2 Revisited

3000≦Income≦4500 is an example of a tight diagnosable selection condition for an OC of Default=1.

In the last example, 3000≦Income≦5700 would not have been a tight diagnosable selection condition, since there is no tuple satisfying Income=5700 ∧Default=1 (Table 2).

EXAMPLE 2.9

Census Example 1.3 Revisited

7688≦capital-gain≦20051 is an example of a tight diagnosable selection condition for an OC of Income=true.

It is noted that given a Condition C such that at least one tuple in R satisfies the outcome condition D, there exists a tight selection condition C' pertaining to the same attributes that C does such that the following desirable properties hold:

$$\sigma_{C \wedge D}(R) \subseteq \sigma_{C' \wedge D}(R) \qquad 1.$$

$$\sigma_{C' \wedge \neg D}(R) \subseteq \sigma_{C \wedge \neg D}(R) \qquad 2.$$

These properties mean that for any condition C that is not tight, there will exist a closely related tight condition C', which as will be presented infra is no worse than C, and possibly better. By restricting the attention to tight conditions, the technique will be able to drastically reduce the number of conditions that must be considered explicitly, while not overlooking any conditions of interest. For example, in the census income data set, there are 5,000,050,000 conditions for the attribute capital-gain with integral lower and upper bounds in the range [0,99999], yet only 7,140 tight conditions.

Definition 2.5 (confidence of a selection condition) Suppose R is a relation instance over schema A, C is a tight diagnosable selection condition, and D is an OC. The confidence of C is defined as:

$$\mathrm{conf}(C) = \frac{card(\sigma_{C \wedge D}(R))}{card(\sigma_C(R))}$$

Confidence of a tight diagnosable selection condition measures its accuracy: how many of the tuples that satisfy the tight diagnosable selection condition also satisfy the outcome condition. In the manufacturing example 1.1, conditions on the sensor readings C on sensor readings are being looked for such that the proportion of tuple satisfying C and being defective is relatively high when compared to the overall defect rate.

In the loan default prediction example 1.2, the conditions that correspond to customers defaulting on their loans at high rates are of interest, that is conditions with high confidence when Default=1. Confidence is one well known measure of quality of a tight diagnosable selection condition. Another is support defined in the following paragraph.

Definition 2.6 (support) Suppose R is a relation instance over schema A, C is a tight diagnosable selection condition and D is an OC. The support of C is defined as:

$$\mathrm{sup}(C) = card(\sigma_{C \wedge D}(R)).$$

It is important to note that support only measures the cardinality of the numerator of the formula used to compute confidence. For example, a condition can be found with conf(C)=1 in which only one tuple satisfies C ∧D. Such a condition would have a support of just 1. Ideally, we would like to find conditions that have both high support and high confidence. However, in practice there is a trade-off between support and confidence. The rules with the highest confidence will generally have relatively little support.

EXAMPLE 2.10

Manufacturing Example 1.1 Revisited

Suppose the OC, D, is Inspection=14.

Suppose $C_1$ is Sensor1=36, then:
conf($C_1$)=1
sup($C_1$)=1 since the one tuple that satisfies $C_1$ also satisfies $C_1$ ∧D.

Suppose $C_2$ is 6≦Sensor2≦7 ∧Sensor4=8, then:

$$\mathrm{conf}(C_2) = \frac{1}{5}$$

sup($C_2$)=1 since in this case, there is one tuple that supports the condition $C_2$ ∧D out of a total of five conditions satisfying condition $C_2$.

EXAMPLE 2.11

Loan Default Prediction Example 1.2 Revisited

Suppose the OC, D, is Default=1.

Suppose that $C_1$ is Dep=1, then:

$$\mathrm{conf}(C_1) = \frac{1}{2}$$

since there are two tuples that support the condition $C_1$ ∧D out of a total of four conditions satisfying condition C1.

Suppose that $C_2$ is 2000≦Income≦4500, then:
conf($C_2$)=1
sup($C_2$)=3 since all three tuples that support the condition $C_2$ also support the condition D.

EXAMPLE 2.12

Census Example 1.3 Revisited

The support and confidence of the fifteen conditions in the census example are listed in the following Table 4.

TABLE 4

| Condition | Confidence | Support |
|---|---|---|
| 7688 ≤ capital-gain ≤ 20051 | 0.992 | 916 |
| 3103 ≤ capital-gain ≤ 99999 | 0.749 | 1677 |
| Workclass = Self-emp-inc | 0.557 | 622 |
| Occupation = Exec-managerial | 0.484 | 1968 |
| 12 ≤ education-num ≤ 16 | 0.457 | 4174 |
| Relationship = Husband | 0.449 | 5918 |
| Marital-status = Married-civ-spouse | 0.447 | 6692 |
| 26 ≤ age ≤ 75 | 0.297 | 7687 |
| Race = White | 0.256 | 7117 |
| Native-country = United States | 0.246 | 7171 |
| Relationship = Wife | 0.475 | 745 |
| Occupation = Prof-specialty | 0.449 | 1859 |
| 2 ≤ education-num ≤ 16 | 0.242 | 7841 |
| 37 ≤ age ≤ 59 | 0.370 | 5221 |
| Sex = Male | 0.306 | 6662 |

In comparison a condition that included the entire data set would have had a confidence value of 0.241 and a support value of 7,841.

In some cases there are conditions that are of no interest which prompts to define a selection condition constraint.

Definition 2.7 (selection condition constraint) A selection condition constraint is a Boolean predicate on selection conditions, that all selection conditions returned must satisfy.

Two common examples of selection condition constraints are presented infra. Many more examples are possible.

EXAMPLE 2.13

Order k Restriction

A selection condition sc satisfies an order k restriction if the total number of attributes appearing in sc is k or less.

EXAMPLE 2.14

Manufacturing Example 1.1 Revisited

The condition Sensor1=36 ∧ 5≤Sensor2≤6 would satisfy an order 2 restriction, but not an order 1 restriction.

EXAMPLE 2.15

Loan Default Prediction Example 1.2 Revisited

The condition (Dep=1)∧(3000≤Income≤5000) would also satisfy an order 2 restriction, but not an order 1 restriction.

EXAMPLE 2.16

Census Example 1.3 Revisited

All conditions in the set presented previously for the census data example satisfy an order 1 restriction.

EXAMPLE 2.17

Support-confidence Lower Bounds

The conf (C)≧p may be used to denote the selection condition constraint that evaluates to true iff the confidence of C is p or more. Similarly, the sup(C)≧s may be used to denote the selection condition constraint that evaluates to true iff the support of C is s or more. Here, p and s are real numbers.

The selection condition constraint conf(C)≧0.3 says that the precision of the selection condition must be 0.3 or more (for it to be acceptable). Likewise, the selection condition condition constraint sup≧4 says the same w.r.t. support.

The term "selection condition" will be used further herein as shorthand for a "tight diagnosable selection condition that satisfies all selection condition constraints".

Among conditions that satisfy the selection constraints, the conditions are of interest with a relatively high combination of support and confidence. In addition, relatively simple conditions are of interest, that still have high support and confidence. Simpler conditions are less likely to "overfit" the data, and thus in some situations can be more useful than complicated conditions that may have higher support and confidence. The interest in simpler condition leads to definition of a simpler-than ordering.

Definition 2.8 (simpler-than ordering $\geq_{simpler}$) The existence is assumed of a simpler-than ordering $\geq_{simpler}$ which is a reflexive and transitive relation on the set of all selection conditions, where $C_1 \geq_{simpler} C_2$ means $C_1$ is no more complex than $C_2$.

The following example presents some sample simpler-than orderings.

EXAMPLE 2.18

There are many possible simpler-than orderings.

1. $\geq_{simpler1}$: $C_1 \geq_{simpler1} C_2$ iff every attribute occurring in $C_1$ also occurs in $C_2$.

2. $\geq_{simpler2}$: Alternatively, $C_1 \geq_{simpler2} C_2$ iff $C_1$ has the same or fewer distinct attributes occurring in it than $C_2$.

3. $\geq_{simpler3}$: Alternatively, $C_1 \geq_{simpler3} C_2$ iff $C_1$ has fewer distinct attributes than $C_2$ or $C_1$; has the same number of distinct attributes as $C_2$ but fewer numeric attributes.

The example 2.18 presents a set of different "simpler-than" relations. Many others are possible as well. In the subject framework, the application developer can select a "simpler-than" relation he/she likes and use it in conjunction with the reset of the framework.

EXAMPLE 2.19

Manufacturing Example 1.1 Revisited

Consider $C_1$ and $C_2$ from Example 2.10, and the simpler-than orderings from the previous example, then $C_1 \geq_{simpler2} C_2$ and $C_1 \geq_{simpler3} C_2$.

EXAMPLE 2.20

Loan Diagnosis Example 1.2 Revisited

Consider $C_1$ and $C_2$ from Example 2.11, and the simpler-than orderings from Example 2.18, then $C_1 \geq_{simpler2} C_2$, $C_1 \geq_{simpler3} C_1$, $C_2 \geq_{simpler2} C_1$, and $C_2 \geq_{simpler3} C_1$.

EXAMPLE 2.21

Census Example 1.3 Revisited

In the census example we have (workclass=Self-emp-inc) $\geq_{simpler2}$ (7688≤capital-gain≤20051), (workclass=Selfemp-inc)$\geq_{simpler3}$(7688≦capital-gain≦20051), and (7688≦capital-gain≦20051)$\geq_{simpler2}$ (workclass=Self-emp-inc).

Further herein, it is assumed that the application developer has selected an arbitrary but fixed $\geq_{simpler}$ simpler than ordering.

As the next step, support, confidence, and simplicity are combined into one ordering. Combining support, confidence, and simplicity into one ordering will permit us to specify that one condition will be better than another condition, according to any type of "reasonable" type of measure, if the condition is better according to the ordering which will be defined next. The notion of a "reasonable" measure will be formalized when a DDO is defined infra.

Definition 2.9 (support, confidence, simplicity ordering $\geq$, $\succ$) Suppose that $C_1$, $C_2$ are selection conditions. It is said that $C_1 \succ C_2$, iff conf($C_1$)≧conf($C_2$) and sup($C_1$) and $C_{1 \geq simpler} C_2$. Additionally, it is said that $C_1 \succ C_2$ iff $C_1 \geq C_2$ and it is not the case that $C_2 \geq C_1$.

Intuitively, $C_1 \succ C_2$ means that $C_1$ is better than $C_2$ in either support, confidence or simplicity and is not worse than $C_2$ in any of the others.

EXAMPLE 2.22

Manufacturing Example 1.1 Revisited

Consider the selection conditions $C_1$, $C_2$ from Example 2.10 and suppose $\geq_{simpler2}$ from Example 2.18 is selected as the simpler-than ordering, then $C_1 \succ C_2$, since $C_1$ is better than $C_2$ in terms of confidence and simplicity, and is not worse in terms of simplicity.

EXAMPLE 2.23

Loan Default Prediction Example 1.2 Revisited

Consider the selection conditions $C_1$, $C_2$ from Example 2.11 and suppose $\geq_{simpler2}$ from Example 2.18 is again selected as the simpler-than ordering, then $C_2 \geq C_1$, since $C_2$ is better than $C_1$ in terms of support and confidence, and is not worse in terms of simplicity.

EXAMPLE 2.24

Census Example 1.3 Revisited

Consider the selection conditions (maritalstatus=Married-civ-spouse), (37≦age≦59) and suppose $\geq_{simpler3}$ from Example 2.18 is again selected as the simpler-than ordering, then (maritalstatus=Married-civ-spouse)$\succ$(37≦age≦59), since (maritalstatus=Married-civ-spouse) is better than (37≦age≦59) in terms of support, confidence, and simplicity.

An up-set will now be defined which uses the $\succ$-ordering to specify the set of selection conditions which are better than a given selection condition.

Definition 2.10 (up-set) Suppose R is a relation instance over schema A, C is a selection condition, D is an OC, S is a set of selection condition constraints. The up-set of C w.r.t. the above parameters, denoted up(C), is {C'| C' is a selection condition satisfying S and C'$\succ$C}.

Intuitively, the up-set of C denotes the set of all selection conditions that are better than C in terms of the support, confidence, simplicity ordering.

EXAMPLE 2.25

Manufacturing Example 1.1 Revisited

Suppose D is Inspection≠0, the set of selection condition constraints are empty, and the simplicity ordering is $\geq_{simpler2}$ from Example 2.18, then the selection condition 34≦Sensor1≦36 would have an empty up-set, since no condition has better support, confidence, or simplicity than 34≦Sensor1≦36.

EXAMPLE 2.26

Loan Default Prediction Example 1.2 Revisited

Suppose D is Default=1, the set of selection conditions are empty, and the simplicity ordering is $\geq_{simpler2}$ from Example 2.18, then 1≦YPrevEmpl≦2 has an up-set of {2000≦Income≦4500}. 2000≦Income≦4500 is in the up-set because it has better support and confidence than 1≦YPrevEmpl≦2, and is no worse in terms of simplicity.

EXAMPLE 2.27

Census Example 1.3 Revisited

Returning to the census data example, and suppose the simplicity ordering is $\geq_{simpler3}$. The up-set of the condition 12≦education-num≦16 is empty, while the up-set of the condition relationship=Wife is non-empty since (Exec-managerial=occupation)$\succ$(relationship=Wife).

Further, the definition of an up-set is used in defining a set of fringes. The goal in defining fringes is to form a series of sets of selection conditions, such that if a selection condition C is in the $i^{th}$ set, it can be guaranteed that there are at least i conditions which are better than C, according to any "reasonable" measure. Fringes will play an important role in insuring that the second, third, and fourth criterions set-forth in the previous paragraphs are achieved.

Definition 2.11 (fringes) Suppose R is a relation instance over schema A, C is a selection condition, S is a set of selection condition constraints, and $\Delta$ is a semi-equivalence relation on selection conditions. The fringes $F^0$, $F^1$, . . . of the data diagnosis problem w.r.t these definitions are as follows:

$$F^0 = \{C | \text{up}(C) = 0\}.$$

$$F^{i+1} = \left\{ C | \text{up}(C) \subseteq \bigcup_{j \leq i \wedge C' \epsilon F'} \text{up}(C') \right\}.$$

Fringe $F^0$ represents the best possible selection conditions w.r.t. to the support, confidence, simplicity ordering. Fringe $F^1$ represents the set of selection conditions that are only worse according to the support, confidence, simplicity ordering than selection conditions on $F^0$, and so on.

EXAMPLE 2.28

Manufacturing Example 1.1 Revisited

Suppose D is Inspection≠0, S requires all conditions to have order at most 1 and support of at least 2, and the simplicity ordering is $\geq_{simpler2}$ from Example 2.18, then $F^0$ consists of {34≦$Sensor_1$≦36, 45≦$Sensor_3$≦46}.

In the last example, by the definition of fringes, any condition which satisfies the selection conditions constraints and does not appear in $F^0$ must be worse in terms of $\succ$ than $34 \leq Sensor_1 \leq 36$ or $45 \leq Sensor_3 \leq 46$.

EXAMPLE 2.29

Loan Default Prediction Example 1.2 Revisited

Suppose D is Default=1, S requires all conditions to have order at most 1 and support of at least 2, the simplicity ordering is $\geq_{simpler2}$ from Example 2.18, then $F^0$ is $\{2000 \leq Income \leq 4500\}$, and $F^1$ is $\{1 \leq YPresEmpl \leq 5, 32 \leq Age \leq 43, 32 \leq 42, 32 \leq Age \leq 37\}$.

In some situations a condition $C_1$ may be considered to be "better" than $C_2$ where it is neither the case that $C_1 \succ C_2$ or $C_2 \succ C_1$. Further, a general structure called a data diagnosis objective (DDO) will be presented which will permit, if desired, to order two conditions, $C_1$ and $C_2$, based on any "reasonable" measure of goodness of conditions, even if it is not the case that $C_1 \succ C_2$ or $C_2 \succ C_1$.

Definition 2.12 (data diagnosis objective (DDO)) A data diagnosis objective (DDO or short) is a triple $<ED, \subseteq, f>$ where:
1. ED is a nonempty set called the evaluation domain, and
2. $\subseteq$ is a partial ordering on ED, and
3. f is a mapping from selection conditions to ED such that $C_1 \succ C_2 \Rightarrow f(C_2) \subseteq f(C_1)$.

Intuitively, a DDO specifies three components, $<E,D, \subseteq, f>$. ED is a set that will provide the "yardstick" for measuring goodness of a selection function; $\subseteq$ will specify which values in ED are better than other values. Finally, f will explain how to associate a value in ED with a selection condition. The technique of the present invention is extremely generic and allows a wide range of DDOs to be used for diagnostic inference, including all that are considered by the user "reasonable".

Some samples of DDOs are presented infra herein.

EXAMPLE 2.30

There are many possible DDOs that could be used by a diagnostic system. Two possible DDOs of interest are provided infra, where a simplicity ordering is assumed to have been fixed.
1. The triple can be $$\left\{[0,1], \leq a \times \text{conf}(C) + b \times \frac{\sup(C)}{\sup(D)}\right\}.$$

Here, the evaluation domain consists of real numbers in the unit interval [0,1]. The values in this domain are ordered according to the usual less than or equals ordering. f returns a linear combination, based on the confidence and support values as well as the constants a and b which are chosen so that a+b=1.

2. The triple can be $<R \times R, \subseteq, f>$ where:
R×R is the set of pairs of real numbers;
$[x,y] \subseteq [x',y']$ iff $x \leq x'$ and $y \leq y'$ and
$f(C)=[\text{conf}(C), \sup(C)]$.

As the example 2.30 illustrates, f does not have to provide a total ordering for conditions. Virtually all standard metrics for comparing selection conditions can also be used in DDOs. Examples of standard metrics include chi-squared value, confidence, confiction, entropy gain, laplace, lift, gain, gini, and support.

It is important to recognize that the fringes are defined independently of the DDO and therefore it is possible to apply several DDOs to a set of fringes without recomputing the fringes. In fact, the fringe that a condition appears on, can also be a convenient basis for a DDO, as is seen in the next example.

EXAMPLE 2.31

Fringe Based DDO

A DDO can be constructed based on the fringe construction, let f(C)=i where $C \in F^i$, then the triple $<N, \geq, f>$ where f(C)=i defines a DDO.

Even if two selection conditions are "good" according to the selected DDO, a user may not be interested in knowing both conditions if the user deems them to be "more or less" the same, even though they look syntactically different. The concept of a semi-equivalence relation is defined infra which is intended to capture this issue.

Definition 2.13 (semi-equivalence relation on selection conditions) A binary relation $\Delta$ on selection conditions used to compare the similarity of conditions is said to be a semi-equivalence relation iff $\Delta$ is reflexive and symmetric.

It is important to note that a semi-equivalence relation does not need to be transitive. Intuitively, all conditions that are semi-equivalent to each other may be considered to be the same. There are many conditions under which two conditions may be held to be semi-equivalent. For example, for a given application, it might be said that the conditions $0.0001 \leq A \leq 1$ is semi-equivalent to the condition $0 \leq A \leq 1$ because these conditions are almost the same. Some examples of semi-equivalence relations are presented infra.

EXAMPLE 2.32

It can be said that two diagnosable selection conditions $C_1$, $C_2$ are:
1. instance-same iff $\sigma c_1(R) = \sigma c_2(R)$;
2. strongly instance same iff $\sigma c_1(R) = \sigma c_2(R)$ and the set of all attributes in $C_1$ equals the set of all attributes occurring in $C_2$.

Both the relations instance-same and strongly instance same are semi-equivalence relations. (In this case, they also happen to be equivalence relations, but this is not always the case).

EXAMPLE 2.33

Distance Based Semi-equivalence Relation

Suppose a function d which maps pairs of selection conditions to $R \cup \{\infty\}$—furthermore, suppose d satisfies the following conditions:

$d(C,C)=0.$ $d(C_1, C_2) = d(C_2, C_1).$

The function d is not required to satisfy the triangle inequality. The procedure of the present invention groups selection conditions into clusters such that any two selection conditions inside the same cluster lie within a threshold distance of each other. If the space SC of all selection conditions is limited to be finite and t>0 is a value (threshold), then the Algorithm 1 may be used to compute a semi-equivalence relation.

Algorithm 1 uses a threshold number (denoted MAXDIST) to determine when two conditions are sufficiently similar.

---

ALGORITHM 1 proc make_buckets
B = 0, % no buckets yet
While SC ≠ 0 do
    Pick a selection condition sc ∈ SC;
    SC = SC − {sc};
    If(∃b ∈ B)(∀sc' ∈ b)d(sc, sc') ≦ MAXDIST then
        b = b ∪ {sc};
    else
        B = B ∪ {{sc}}; % create new bucket.
end while
return B;
end proc

---

At the end of the Algorithm 1, a set of buckets is returned. It is said that $C_1$, $C_2$ are semi-equivalent if they belong to the same bucket. Different choices in how sc is picked may lead to different buckets. In order to avoid this (and perhaps to achieve optimized "bucketing") the following procedure can be used:

Define the width of a bucket b to be max({d(sc,sc')|sc, sc'∈b}). Suppose, a partition $P_1 \cup \ldots \cup P_r$ of all selection conditions. The width of the partition is $\Sigma_{i=1}^{r}$width($P_i$). The smaller the width of the partition, the more similar items within a bucket are deemed to be by the distance function d. Hence, the goal is to find a partition of the set of selection conditions that has minimal width. The following theorem 2.1 says that computing a minimal width partition is NP-complete, as presented in C. E. Leiserson, R. L. Rivest, and C. Stein. Introduction to Algorithms. MIT Press, 2001.

Theorem 2.1 Suppose d is a polynomially computable distance function, t>0 is a threshold, and C is any set of selection conditions. Suppose P is a partition of C. Checking if P is a minimal width partition is NP-complete.

The following Algorithm 2 can be used to find a partition of C which is optimal.

---

ALGORITHM 2 proc make_optimal_buckets
B = {{sc}|sc ∈ SC}; (*each sc is in its own bucket*)
OPEN = {B}; CLOSED = 0;
Best = NIL; Best Width = ∞;
while OPEN ≠ 0 do
    Pick a partition p ∈ OPEN;
    (*generate possible new partitions by merging two buckets in p.*)
    (*insert the new partition int oOPEN as long as it does not exist in*)
    (*either OPEN or CLOSED*)
    foreach $b_1$, $b_2$ ∈ p do
        if(p − {$b_1$, $b_2$} ∪ {$b_1$ ∪ $b_2$}) ∈ CLOSED ∪ OPEN then
            insert((p − {$b_1$, $b_2$}∪ {$b_1$ ∪ $b_2$}, OPEN)
            if width(p − {$b_1$, $b_2$} ∪ {$b_1$ ∪ $b_2$}) < best Width then
                Best = p − {$b_1$, $b_2$} ∪ {$b_1$ ∪ $b_2$};
                BestWidth = width(p − {$b_1$, $b_2$} ∪ {$b_1$ ∪ $b_2$});
    end foreach
    OPEN = OPEN − {p};
    CLOSED = CLOSED ∪ {p};
endwhile
return Best;
end proc

---

As in the case of the make_buckets Algorithm A, the make_optimal_buckets Algorithm 2 may also be used to define a semi-equivalence relation. Specifically, two selection conditions are considered to be semi-equivalent if they are in the same bucket.

In the next example 2.34 infra, a semi-equivalence relation is presented that is easy to compute. The existence of a distance metric, d, is assumed for all numeric attributes.

EXAMPLE 2.34

Attribute Distance Threshold Semi-equivalence Relation

Suppose for an attribute, A, and a condition, C, $L_{CA}$ and $U_{CA}$ are defined to be the lower and upper bounds, respectively, of attribute A in condition C.

It can then be said that C, and $C_2$ are semi-equivalent iff all the following hold:

1. The set of attributes appearing in $C_1$ is equivalent to the set of attributes appearing in $C_2$.

2. For each numeric attribute, A, appearing in $C_1$ and $C_2$ $$(a) d(L_{C1A}, L_{C2A}) \leq \epsilon_A$$

$$(b) d(U_{C1A}, U_{C2A}) \leq \epsilon_A$$

where the $\epsilon_A$ values are constants that may differ based on the attribute A.

3. For each non-numeric attribute, A, appearing in $C_1$ and $C_2$, $L_{C1A} = L_{C2A}$.

EXAMPLE 2.35

Manufacturing Example 1.1 Revisited

Returning to the manufacturing example 1.1 and suppose an attribute distance threshold semi-equivalence relation with $\epsilon_{Sensor3}=1$ and d=|·| and the standard absolute value metric. Then the conditions 45≦$Sensor_3$≦46 and 44≦$Sensor_3$≦47 are semi-equivalent. However, the conditions 45≦$Sensor_3$≦46, 45≦$Sensor_3$≦48 would not be semi-equivalent.

EXAMPLE 2.36

Loan Default Prediction 1.2 Example

Returning to the loan default prediction example 1.2, suppose an attribute distance threshold semi-equivalence relation with $\epsilon_{Income}=500$ and d=|·|, the standard absolute value metric. In this case 2000≦Income≦4000 and 2250≦Income≦4250 would be semi-equivalent, but the conditions 2000≦Income≦4000 and 2750≦Income≦4750 would not be.

EXAMPLE 2.37

Census Example 1.3 Revisited

Returning to the census data example 1.3, suppose an attribute distance threshold semi-equivalence relation with d=|·|, the standard absolute value metric. Further suppose that $\epsilon_{Age}=15$, $\epsilon_{education-num}=2$, $\epsilon_{capital-loss}=10000$, and $\epsilon_{hours-per-week}=10$, then no two conditions in the set presented in Example 1.3 are semi-equivalent.

As in the census data example 2.37, defining an appropriate semi-equivalence will provide the means to ensure that the fifth criteria for diagnostic frameworks outlined supra will be achieved, namely that the set of conditions returned will not have any redundant elements.

The definition of semi-equivalence is employed in the method of the present invention to a set of fringes, to eliminate redundant elements. In view of this, a compact set is to be defined, as presented infra.

Definition 2.14 (compact set) Suppose C is a selection condition, $(ED, \subseteq, f)$ is a DDO, and $\Delta$ is a semi-equivalence relation on the selection conditions. A subset CF of a set of selection conditions F is said to be a compact representation of F w.r.t. $\Delta$ iff:

1. For each sc$\in$F, $\exists$sc'$\in$CF such that sc$\Delta$sc'
2. If sc$\in$F and sc$\notin$CF, then $\exists$sc'$\in$CF such that sc$\Delta$sc'($\neg$($f$(sc') $\subseteq f$(sc)v($f$(sc')=$f$(sc))
3. There is no strict subset CF' of CF satisfying the above two conditions.

The first condition requires that any selection condition in the original set, be semi-equivalent to at least one selection condition in the compact set. The second condition requires that for any selection condition that was removed from the original set, there exist a semi-equivalent condition in the compact set that is not strictly worse than the removed selection condition. The third condition requires a compact set be minimal.

Some examples of the compact sets are presented infra.

EXAMPLE 2.38

Manufacturing Prediction Example 1.1 Revisited

Consider $F^0$ from Example 2.28, and suppose the semi-equivalence relation is a distance threshold relation with all $\epsilon$ values set to 1. Independent of the choice of DDO, the compact representation of $F^0$ is still $\{34 \leq Sensor_1 \leq 36, 45 \leq Sensor_3 \leq 46\}$, since $34 \leq Sensor_1 \leq 36$ and $45 \leq Sensor_3 \leq 46$ are not semi-equivalent.

EXAMPLE 2.39

Loan Default Example 1.2 Revisited

Consider $F^0 \cup F^1$ from Example 2.29, where the semi-equivalence relation is a distance threshold relation with $\epsilon_{YPresAdd} = \epsilon_{YPresEmpl} = \epsilon_{Age} = 5$, $\epsilon_{Income} = \epsilon_{LPay} = 500$, $\epsilon_{Dep} = 1$. Suppose a fringe based DDO is chosen, then the two possible compact representation of $F^0 \cup F^1$ are $\{2000 \leq Income \leq 4500, YPresEmpl \leq 5, 32, \leq Age \leq 42\}$ and $\{2000 \leq Income \leq 4500, 1 \leq YPresEmpl \leq 5, 32 \leq Age \leq 47\}$.

In the last example if the DDO has ordered $32 \leq Age \leq 42$ before $32 \leq Age \leq 47$ or vice versa, then there would have only been one possible compact set. Also note that in the last example, that if $\epsilon_{Age} \leq 5$, the compact set would be $F^0 \cup F^1$.

EXAMPLE 2.40

Census Example 1.3 Revisited

Suppose $\geq_{simpler2}$ from Example 2.18 is used as the simplicity ordering, then $\{7688 \leq capital\text{-}gain \leq 20051$, $3103 \leq capital\text{-}gain \leq 99999$, workclass=Self-emp-inc, occupation=Exec-managerial, $12 \leq education\text{-}num \leq 16$, relationship=Husband, maritalstatus=Married-civ-spouse, $26 \leq age \leq 75\} \subseteq F^0$ while $\{2 \leq education\text{-}num \leq 16$, race=White, native-country=United States, relationship=Wife, occupation=Prof-specialty, $37 \leq age 59$, sex=Male$\} \subseteq F^1$.

In the example 2.40, only a subset of $F^0$ and $F^1$ has been presented. In particular, it is to be noted that $2 \leq education\text{-}num \leq 16$ and $37 \leq age \leq 59$ appear on $F^1$ while no conditions from their up-set were returned. No conditions from their upset were returned, since they were all semi-equivalent to at least one condition that was returned.

Taking the compact representation of a set of fringes will permit to achieve the third, fourth, and fifth criterions set forth supra. By allowing the user to specify the number of fringes of interest, the user has some control over the number of conditions returned, thus achieving the second criterion from the set thereof. The framework presented handles numeric and non-numeric data, and thus also meets all the criteria we have established for a desirable diagnostic inference framework.

The key goal of the automated data diagnosis solved by the algorithms of the present invention presented in detail infra, is stated as follows:

Suppose R is a relation instance over schema A, D is an OC, $<ED, \subseteq, f>$ is a DDO, S is a set of selection condition constraints, $\geq_{simpler}$ is a simpler-than ordering, $\Delta$ is a semi-equivalence relation on selection conditions. For a given integer $j \geq 0$, finding a compact representation of $F^0 \cup \ldots \cup F^j$ will give an optimal set of conditioning of the diagnosable attributes of the relation R for the outcome condition OC.

EXAMPLE 2.41

Census Example 1.3 Revisited

The set presented in Example 1.3 is a compact representation of $F^0 \cup \ldots \cup F^1$ where the outcome condition OC is Income=true, the DDO is a fringe based DDO, the selection condition constraints contains just an order 1 restriction, the simpler-than ordering is $\geq_{simpler2}$ from Example 2.18, and the semi-equivalence relation is from Example 2.37.

Referring to FIG. 1, a system for an automated manufacturing data diagnosis of the present invention includes a computer system 12 which includes input means 14 for receiving and storing measured parameters of the product 16, R creating block 18 for creating (or specifying) a relation R containing the data corresponding to the input measurement results, an interface unit 20 for interfacing of the computerized system 12 with the user 22 permitting the user to specify certain parameters, needed for the automated data diagnosis, and a processor 24 ran by the software 26 of the present invention for computing the optimal set of conditions for separating desired attributes of the product 16 from undesirable ones. The system 10 of the present invention also includes means 28 for obtaining data characterizing the product 16. In the specific example which is the manufacturing process for fabrication of the product 16 discussed herein for the sake of simplicity but not in order to limit the system of the present invention only to this specific application, such data acquisition means 28 includes sensors for measuring different characteristics of the product 16. The measured characteristics of the product 16 then are submitted to the input 14 of the computerized system 12 for further analysis.

Figure 2:
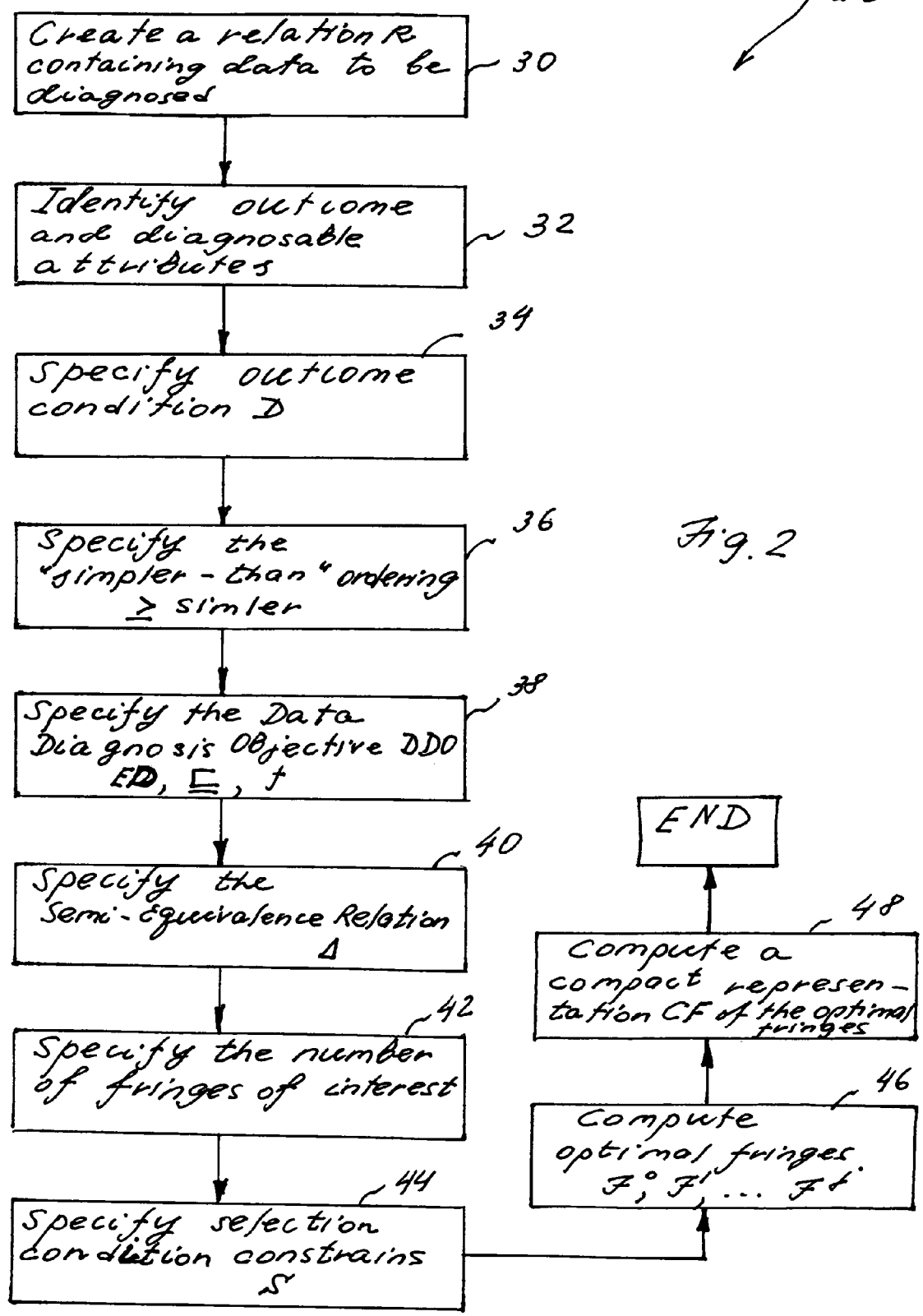
FIG. 2 is a flow-chart diagram of the method for automated data diagnosis of the present invention.

Referring again to FIG. 1, and also to FIG. 2, which represents a flow chart diagram of the process for automated data diagnosis of the present invention, the user 22 in the logical block 30 "Create a Relation R Containing Data to be Diagnosed" creates a relation R containing the data to be diagnosed. This relation is either created in the block 18 of the system 10, best shown in FIG. 1, or alternatively, if a single relation already exists apriori, then the step may merely involve specifying what that relation R is, or may involve eliminating irrelevant columns from that relation (which can be performed by projection operation well-known in the relational algebra, as best described in J. D. Ullman, Principles of Database and Knowledge Based System, Computer Science Press, 1989). Alternatively, the application developer may need to access multiple data sources in order to create such a relation. The relations created in block 30 may have the form of the Tables 1, 2, or 3, or any other relational database applicable to different applications. For example, for the manufacturing example 1.1, Table 1 will serve as a relation R where the columns of the Table represent attributes of the product, while the rows of the Table 1 represent tuples which record information about a particular entity (item ID). In the Table 1, for each item of the product 16 manufactured, the sensors 28 record various aspects of the product as it moves for example along a production line, from the raw material stage to the finished product, or part thereof.

From the logical block 30, the procedure moves to block 32 "Identify Outcome and Diagnose Attributes". In the Table 1, each of the sensors readings, together with an "ItemID" attribute, correspond to a diagnosed attribute. While the attribute "Inspection" corresponds to the outcome attribute. At the end of the manufacturing process, quality control inspectors inspect the resulting product and either assign it 0 (pass inspection), or a defect code number, specifying a certain kind of defect. This finding can then be represented in the Table 1 as the outcome attribute inspection.

From the block 32, the logic flows to the block 34 "Specify Outcome Condition D". In this step, the user 22 specifies a defective outcome condition. The step involves articulating a selection condition in any relational language, e.g., SQL. As presented supra with regard to definition 2.1, an outcome condition D is any selection condition that only involves outcome attributes. For the manufacturing example 1.1, two possible outcome conditions that may be specified are Inspection=14 and Inspection≠0.

From block 34, the flow chart moves to the block 36 "Specify the Simpler-Than Ordering". In this step, the user 22 may explicitly encode a function (in any programming language), that takes to selection conditions C1, C2. The function would return "true" to indicate that C1 is simpler than C2, or "false" to indicate otherwise. Alternatively, the application developer could select a simpler-than ordering from a pick list of such orderings.

The selection conditions C1 and C2, are specified in accordance with the definitions 2.3 (Diagnosable Selection Condition) and 2.4 (Tight Diagnosable Selection Condition), and for the manufacturing example 1.1, sensor 1=36; sensor 2=6 is an example of a tight diagnosable selection condition for an outcome condition D of Inspection=14. Suppose C1 is sensor 1=36 and suppose C2 is 2≦Sensor 2≦7 ∧Sensor 4=8.

In the block 36, the simple-than ordering is specified in accordance with the definition 2.8 and example 2.18 presented supra herein. For the manufacturing example 1.1, considering C1 and C2 from example 2.10, and the simpler than ordering from the previous example 2.18, then $C1 \geqq simpler_2 C2$ and $C1 \geqq simpler_3 C2$.

From the logical block 36, the logic moves to the block 38 "Specify the Data Diagnosis Objective (ED,⊆,ƒ)". In this step, the user 22 specifies an evaluation domain, a partial ordering on the evaluation domain, and a mapping that maps selection condition to the evaluation domain satisfying the axioms of definition 2.12. Again, the user 22 may explicitly write code to specify these components or just choose them from a list of predetermined data diagnosis objectives.

Further, the flow chart proceeds to the logical block 40 "Specify the Semi-Equivalence Relation", wherein the user 22 must specify the semi-equivalence relation on selection conditions in accordance with Definition 2.13 presented supra, taken into consideration example 2.32 and example 2.33. Semi-equivalence relation can be computed in block 40 either by the Algorithm 1 or the Algorithm 2 presented supra herein.

The attribute distance threshold semi-equivalence relation can be also used to specify the constrain in block 40, as presented in the example 2.34. For the manufacturing example 1.1, the conditions 45≦sensor 3≦46 and 44≦sensor 3≦47 will be semi-equivalent. By specifying the semi-equivalence relation, the procedure of the present invention insures that the set of conditions returned will not have any redundant elements. The definition of semi-equivalence is employed in the method and system of the present invention to a set of fringes to eliminate redundant elements by generating a compact set of the optimal fringes, as will be presented infra herein.

From the block 40, the procedure flows to block 42 "Specify the Number j+1 of Fringes of Interest". The definition of fringes is introduced supra by the definition 2.11 and the example 2.28 presents fringes for the manufacturing example 1.1. By allowing the user to specify the number of fringes of interest, the user has some control over the number of conditions returned.

Further, the flow chart proceeds to the block 44 "Specify Selection Condition Constrains". In this step, the user has the option to specify three numbers. One number denotes the minimal confidence that is acceptable, another denotes the minimal support that is acceptable, and the third denotes the maximum order of selection condition. The selection constrains is specified in accordance with definition 2.7, presented supra. For the manufacturing example 1.1, the selection condition constrain can be as in the example 2.14 supra, where the condition sensor 1=36 ∧5≦sensor 2≦6 would satisfy an order 2 restriction. The minimal confidence is specified by the definition 2.5 supra; the support is specified in accordance with definition 2.6 supra, as presented in example 2.10 with regard to the manufacturing example 1.1. Among conditions that satisfy the selection constraints, the conditions of interest are those with a relatively high combination of support and confidence. In addition, relatively simple conditions are of interest that still have high support and confidence. Simpler conditions are less likely to "overfit" the data and thus, in some situations, can be more useful than complicated conditions that may have higher support and confidence. The interest in simpler conditions leads to use the specified simpler than ordering parameter, as was done in the logical block 36.

From the block 44, the logic proceeds to block 46 "Compute optimal fringes F0, F1 . . . " in accordance with the definition 2.11 and as will be described in detail infra.

From the block 46, the procedure flows to the block 48 "Compute a Compact Representation CF of the Optimal Fringes" which will be presented more in detail in further paragraphs. After the block 48, the procedure ends as the optimal set of conditions of the diagnosable attributes of the relation R for the outcome condition D has been formed.

The computation of the optimal fringes (logical block 46) for the data diagnosis problem, and computation of compact representation of the optimal fringes (logical block 48) will be presented in detail in the following paragraphs. The system 10 uses a special data structure defining a condition graph (referred further herein as COG) that has been designed as part of the technique of the present invention.

Assuming that R is a relation instance created in block 30 of FIG. 2, A, D is an OC, as specified in block 34, (ED,⊆,*f*) is a DDO as specified in block 38, S is a set of selection condition constraints specified in block 44, Δ is a semi-equivalence relation on selection conditions specified in block 40, j+1 is the number of fringes of interest specified in block 42, and ≧simpler is the simplicity ordering. All these parameters are arbitrarily fixed by the user to whatever value is appropriate for the particular problem domain.

Condition Graph

A condition graph is comprised of a set of vertices V and a set of edges E. Suppose T is a set of tight selection conditions satisfying the selection condition constraints, S. Let T' be the subset of selection conditions that appears on one of the first j+1 fringes. Each vertex has a condition field which stores a selection condition, assuming φ map a condition, C, to a vertex, v, in which v condition=C. The set of vertices, v can then be defined as {φ(C)|C∈T'}.

The selection condition that a vertex corresponds to is stored in the condition field of the vertex. The set of edges, E, is defined as:

$$\{(u,v)|u,v \in V \wedge (u.condition \succ v.condition) \wedge \neg \exists \omega \in V \\ s.t.(u.condition \succ w.condition \succ v.condition)\}$$

The level of a vertex, v in the graph, will correspond to the fringe of v.condition where:
1. level(v)=0 if there is no other vertex v such that (v',v)∈E.
2. level(v)=MAX {level(v)+μ1|(v',v)∈E}.

In addition to a condition field, a vertex v will also have the following fields:
1. level which contains level(v)
2. support which contains sup(v.condition)
3. confidence which contains con f(v.condition)
4. parents which contains {u|(u,v)∈E}.
5. children which contains {u|(v,u)∈E}.

A vertex with level(v)=0 is called a root. All root vertices will be linked together via a linked list. The nodes of the linked list will contain two fields:
1. vertex which contains a root vertex
2. next which is a point to another root node, or the value nil if it is the last node in the list.

Algorithm #3 "Build_COG" is used to build COG according to the parameters specified in blocks 34-44 of FIG. 2.

---

ALGORITHM #3 proc Build_COG(R, A, D, S, j, ≧ simpler)
(*The procedure generates all tight selection conditions satisfying S, and evaluates their support and confidence *)
(*For each condition generated satisfying S a call is made to Insert_COG).
    RootList = nil;(*Initially there are no vertices in the graph*)
    For each combination, φ, of attributes in A that do not violate S do
        (*TheBuildDataStructure calls builds data structures to store the projection on the attributes φ*)
        (* of the tuples that satisfy D and ¬D respectively*)
        DPoints = BuildDataStructure(R, A, φ, D,);
        NotDPoints = BuildDataStructure(R, A, φ, ¬D);
        boundsActive = 0; (*The set contains the bounds of the condition currently being enumerated*)
        initstack(boundsStack); (*a stack of bounds to try in the current search direction*)
        boundsToInstantiate = {L ≦ ϑ |ϑ ∈ φ} {ϑ ≦ U|ϑ ∈ φ};
        (*To establish a condition a lower and upper bound must be instantiated for each attribute in φ*)
        pick a ρ ∈ boundsToInstantiate;
        boundsToInstantiate = boundsToInstantiate − {ρ};
        valueSet = RangeQuery(boundsActive, DPoints, ρ);
        (*RangeQuery finds all tuples in DPoints satisfying boundsActive, and *)
        (*returns the projection of the tuples on the attribute appearing in ρ*)
        push(boundsStack, <valueSet, ρ>);
        while not emptyStack(boundsStack) do
            boundPair = pop(boundsStack);(*a boundPair contains two fields, ρ and valueSet*)
            (*ρ is an uninstantiated bound, and valueSet is a set of possible instantiations for the bound*)
            if(boundPair.valueSet ≠ nil) then
            pick a τ ∈ boundPair.valueSet;
            boundPair.valueSet = boundPair.valueSet − {τ};
            boundsActive = boundsActive ∪ Instantiate(ρ, τ);
            (*Instantiate simply instantiates the bound ρ with the value τ *)
            push(boundsStack, boundPair);
            if(boundsToInstantiate = nil) then
                (*A completely instantiated condition has been generated*)
                numD = CountQuery(boundsActive, D Points);
                numNotD = CountQuery(boundsActive, NotD Points);
                (*CountQuery takes a set of bounds and a set of tuples, *)
                (*and returns the number of tuples satisfying the bounds *)
                if(Satisfy Constraints(S, boundsActive, numD, numNotD)) then
                    (*SatisfyConstraints returns true iff the condition defined by -continued

ALGORITHM #3

```
boundsActive satisfies S *)
                    v = new vertex( ); (*allocates storage for a new vertex *)
                    v.support=numD; v. confidence = (numD)/(numD+numNotD);
                    v. level = 0, v.children=nil; v.parents=nil;
                    Insert_COG(v, RootList, j, ≧ simpler);
            end if;
        else(*we have more bounds that need to be instantiated *)
            pick a ρ ∈ boundsToInstantiate;
            boundsToInstantiate = boundsToInstantiate − {ρ};
            valueSet = RangeQuery(activeConstraints, DPoints, ρ);
            push(boundsStack, (valueSet, ρ));
        end if;
    else(*we are done with boundPair ρ for now*)
        boundsToInstantiate=boundsToInstantiate ∪ {boundPair.p};
    end if;
end while;
```

Figure 3:
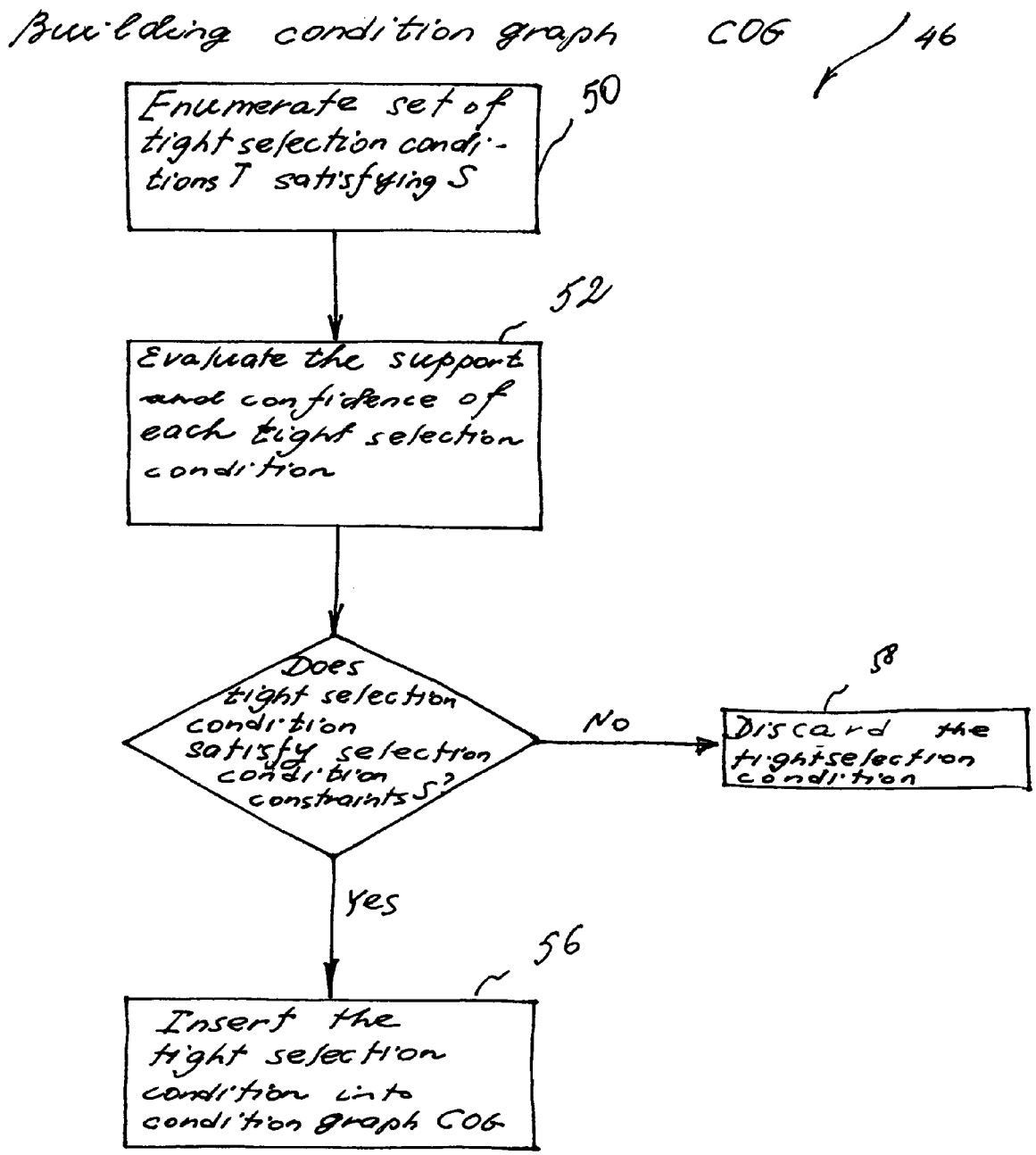
FIG. 3 is a flow-chart diagram of the process of building the condition graph (COG) of the present invention.

Algorithm #3 which is a part of the overall framework of the present invention, is used to build a COG according to the parameters specified in blocks 34-44 of FIG. 2. Referring to FIG. 3 which is a flow chart diagram of the Algorithm #3, the procedure in block 50 "Enumerate Set of Tight Selection Conditions T" will first enumerate all type selection conditions T satisfying the selection condition constraints S, specified in block 44 of FIG. 2. From the block 50, the procedure flows to block 52 "Evaluate the Support and Confidence of Each Type Selection Condition", where the program evaluates the support and confidence of each type selection condition of the set T thereof. Further, the flow chart moves to block 54 "Does the Type Selection Condition Satisfy Selection Condition Constraints S?" Those conditions that satisfy the selection condition constraints will then be inserted into COG via a call to insert-COG in block 56 "Insert the tight selection condition into condition graph" which will be discussed in detail in further paragraphs. If the condition fails to satisfy S, it is discarded in the block 58.

The Algorithm #3 makes use of standard operations on a stack, such as initstack, push, pop, and isempty. These algorithms are described in D. E. Knuth, The Art of Computer Programming, Vol. 1, Fundamental Algorithms, Addison Wesley.

Any data structure which supports range and count queries over point data can be used to store DPoints and NOTDPoints presented on Lines 8 and 9 of the Algorithm #3. However, a k-d tree is a data structure which is particularly effective for range and count queries for data of arbitrary dimensions, as can be presented in H. Samet, The Design and Analysis of Spatial Data Structures, Addison-Wesley, 1990.

It is important to note that the number of combinations that the Build-COG Algorithm #3 must consider is polynomial if an order constrained bound is provided, but exponential if no such bound is provided.

The Algorithm #4, presented infra, Insert-COG which runs in block 56 of FIG. 3, is used to insert conditions into the COG. The procedure insert-COG invokes three procedures InsertDownwards, AddChildLinks, and UpdateLevelAndEliminate that will be presented infra herein.

ALGORITHM #4

```
Proc Insert_COG(v, RootList, j, ≧ simpler)
(*v is the vertex to insert, RootList points to the first root of the COG root list, and *)
(*j is the maximum number of fringes in the COG. ≧ simpler is the simplicity ordering.
Procedure inserts v into the COG. *)
    if(RootList = nil) then
            (*COG is empty, v is the first vertex inserted into the COG, new ListNode( ) allocates
memory. *)
            RootList = new ListNode( ); RootList.vertex=v; RootList.next=nil;
    Else
            CurrRootPtr=RootList; BackRootPtr=nil;
            Inserted Vertex=false; InsertedAsRoot=false;
            Visited={ };
            while(CurrRootPtr ≠ nil) do (*Traversing list of roots*)
                    if(CurrRootPtr.vertex.condition ≻ v.condition then
                            (*results of ≻ evaluation is dependent on the ≧ simpler parameter*)
                            (*InsertDownwards will make v a descendant of CurrRootPtr.vertex *)
                            Visited=InsertDownwards(Visited, v, CurrRootPtr.vertex, j, ≧simpler);
                            BackRootPtr=CurrRootPtr; CurrRootPtr=CurrRootPtr.next;
                            Inserted Vertex=true;
                    else if(v.condition ≻ CurrRootPtr.vertex.condition) then
                            (*v needs to become the parent of CurrRootPtr.vertex *)
                            CurrRootPtr.vertex.parents=CurrRootPtr.vertex.parents ∪ {v};
                            v. children=v. children ∪ {CurrRootPtr.vertex} ;
                    (*UpdateLevelsAndEliminate updates the levels of CurrRootPtr.vertex and
descendants *)
```

-continued

ALGORITHM #4

```
        UpdateLevelsAndEliminate(CurrRootPtr. Vertex, v.level + 1, j);
        if(¬InsertedAsRoot) then (*add vertex to root list, remove old root *)
            InsertedAsRoot = true; InsertedVertex = true;
            TempRootPtr = new ListNode( );
            TempRootPtr.next = CurrRootPtr.next; TempRootPtr.vertex=v;
            if(BackRootPtr = nil) then
                RootList = TempRootPtr;
            else
                BackPtr.next=TempRootPtr;
            end if;
            BackPtr=TempRootPtr;CurrRootPtr=BackPtr.next;
        else(*just remove the old root*)
            BackPtr.next=CurrRootPtr.next; CurrRootPtr = BackPtr.next;
        end if;
    else
        (*v is not a descendant of CurrRootPtr.vertex, but still may be the parent *)
        (* of descendants of CurrRootPtr.vertex calling AddChildLinks to find children of
v *)
            Visited = AddChildLinks(Visited, v, CurrRootPtr.vertex, j, ≧ simpler);
            BackRootPtr = CurrRootPtr; CurrRootPtr = CurrRootPtr.next;
        end if;
    end while;
    if(¬Inserted Vertex)(* vertex has not been inserted, adding to the front of the root list
*)
        TempRootPtr = newListNode( );
        TempRootPtr.vertex = v; TempRootPtr. Next = RootList;
        RootList = TempRootPtr;
    end if;
    end if;
return RootList;
end proc;
```

The procedure InsertDownwards, presented as the Algorithm #5, takes 5 parameters into consideration. The first parameter "Visited" is a set of vertices already visited, used to avoid visiting the same vertex multiple times; v is a vertex to insert, and "parentVertex" is a vertex which is known to be better than v, but v is not yet a descendant of it. The parameter j is a maximum fringe number specified by the user. The last parameter and ≧simpler is the simpler than ordering. The procedure either called AddChildLinks and InsertDownward recursively, or adds the appropriate child and parent links directly.

ALGORITHM #5

```
procInsertDownwards(Visited, v, parentVertex, j, ≧ simpler)
(* Visited is the set of vertices already visited, v is the vertex to insert, *)
(*parentVertex is a vertex better than v, j is the maximum fringe number, and ≧simpler is the
simpler-than ordering *)
        if(parentVertex ∈Visited) then
            Visited = Visited ∪ {parentVertex};
            InsertedVertex = false; AddedLinkToParent = false;
            for each u ∈ parentVertex.children do
                if(u.condition ≻ v.condition) then
                    (*v also needs to be a descendant of u, calling InsertDownwards recursively *)
                    Visited = InsertDownwards(Visited, v, u, j, ≧ simpler);
                    Inserted Vertex = true;
                else if(v. condition ≻ u.condition) then(*v will be an ancestor of u *)
                    if(∀ w ∈ u.parents w.condition ≻ v.condition) then
                        (*v will be a parent of u, if not already *)
                            u.parents=u.parents-{parentVertex};
                            parentVertex.children = parentVertex.children ∪ {v};
                            AddedLinkToParent=true;
                            UpdateLevelsAndEliminate(v, parentVertex.level + 1, j);
                    end if;
                    if(u ∈Visited) then(*connect u to v *)
                                Visited = Visited  ∪u};
                                u.parents=u.parents ∪ {v};
                                v.children=v.children ∪ {u};
                                UpdateLevelsAndEliminate(u, v.level + 1, j);
                            end if;
                            InsertedVertex = true;
                        end if;
                    else(* v may still be the parent of descendants of u *)
```

ALGORITHM #5

```
              Visited = AddChildLinks(Visited, v, u, j ≧ simpler);
           end if;
        end for;
        if(¬Inserted Vertex) then (*make v the child of parentVertex *)
           v.parents = v.parents ∪ {parentVertex};
           parentVertex.children=parentVertex.children ∪ {v};
        end if;
    end if;
return Visited;
end proc;
```

The procedure AddChildLinks takes a vertex v being inserted, and a "parentVertex". v is not a descendant of "parentVertex", however, v may be the parent of descendants of "parentVertex". If v is better than a child of "parentVertex", then the appropriate links are added. The procedure AddChildLinks is presented as the Algorithm #6.

ALGORITHM #6

```
Proc AddChildLinks(Visited, v, parentVertex, j, ≧ simpler)
(*Visited is the set of vertices already visited, v is the new vertex being
inserted, *)
(*parentVertex is not better than v, j is the maximum fringe number,
and ≧simpler is the simpler-than ordering *)
    for each u ∈ parentVertex.children s.t. u ∉Visited do
       Visited = Visited ∪ {u};
       if(v.condition ≻ u.condition) then (*v is better than u*)
          if(∀ w ∈ parents w.condition ≻ v.condition) then (*v is the
                  parent of u *)
             u.parents = u.parents ∪ {v};
             v.children = v.children ∪ {u};
          end if;
       else(* v is not better than u, call AddChildLinks recursively *)
          Visited = AddChildLinks(Visited, v, u, j, ≧ simpler);
       end if;
    end for;
return Visited;
end proc;
```

The next procedure UpdateLevelsandEliminate is used to update the level of the vertices in the graph COG, and to remove vertices that fall below the jth level. This procedure UpdateLevelsandEliminate is presented as the Algorithm #7.

ALGORITHM #7

```
procUpdateLevelsAndEliminate(v, LevelLowerBound, j)
(*The vertex v cannot have a level any lower than LevelLowerBound and
may need to be updated*)
(*If the level of v is greater than j it needs to be removed*)
    oldlevel = v.level;
    v.level = MAX(v.level, LevelLowerBound);
    if(v. level > j) then
         (*v will be removed from the graph, by removing all links
         to it from its parents*)
         for each u ∈ v. children do
            u.children = u.children − {v};
         end for;
    else if(v. level > oldlevel) then (*level of v has changed*)
         (*recursively call UpdateLevelsAndEliminate on all
         descendants of v *)
         for each u ∈ v.children do
            UpdateLevelsAndEliminate (u, v, level + 1, j);
         end for;
    end if;
end proc;
```

After computing the optimal fringes $F^0, \ldots F^j$, in block 46 of FIG. 2, as presented by the flow chart of FIG. 3 and the Algorithms #3-#7, a compact representation of these fringes is generated in block 48 of the FIG. 1 by invoking the Compact_Fringes Algorithm #8:

ALGORITHM #8

```
procCompact_Fringes(RootPtr, (ED, ⊆, f), Δ
(*The procedure returns the set of vertices in the COG pointed to by
RootPtr after removing semi-equivalent conditions. *)
    CompactSet = 0;
    V = Traverse_COG(RootPtr); (*Procedure returns all the vertices
    in the COG*)
    OrderedConditions = TotalOrderConditions(V, <ED, ⊆, f>, Δ);
    (*TotalOrderConditions returns a total ordering of the *)
    (*conditions stored in v, that is consistent with the ⊆ of the DDO*)
    while OrderedConditions ≠ 0 do
         Let C be the first condition in OrderedConditions;
         OrderedConditions=OrderedConditions − {C};
         if(∀x∈ CompactSet ¬(C Δ x)) then
            CompactSet=CompactSet ∪ {x};
         end if;
    end while;
    return CompactSet;
end proc;
```

Algorithm #8 uses the subroutine TotalOrderConditions (V, <ED,⊆,f>, Δ) that returns a total ordering of the conditions stored in V—the total ordering returned must be consistent with the partial ordering ⊆ used in the DDO. This Algorithm TotalOrderConditions may be the well known problem of topological sorting for which many algorithms exist, as for instance, presented in D. E. Knuth, "The Art of Computer Programming", Vol. 1, Fundamental Algorithms.

The Algorithm #8 also uses the subroutine Traverse_COG (Algorithm #9) to traverse the COG pointed to by RootPtr, and returns all the vertices in the COG.

ALGORITHM #9

```
proc Traverse_COG(RootPtr)
(*Procedure returns all vertices in the COG pointed to by RootPtr*)
(The procedure traverses the root list, calling TraverseDown_COG for
each root*)
    V = 0;
    while(RootPtr ≠ nil) do
         V = V ∪ TraverseDown_COG(RootPtr.vertex, V);
         RootPtr = RootPtr.next;
    end while;
    return V;
end proc;
```

The sub-routine TraverseDown_COG of TraverseDown, is presented as Algorithm #10.

---
ALGORITHM #10
---
```
proc TraverseDown.COG(v, Visited)
(*Procedure adds all vertices that are descendants of v, and not already in
Visited to Visited*)
    if(v ∈ Visited) then
        Visited = Visited ∪ {v};
        for each u ∈v. children do
            Visited = TraverseDown_COG(u, Visited);
        end for;
    end if;
return Visited;
end proc;
```
---

The execution time of the Algorithm #3 (Build_COG) depends primarily on the number of conditions that must be explicitly enumerated in Block 50 of FIG. 3. The number of conditions that must be explicitly enumerated depends on the number of combinations of attributes that must be considered, and then for each combination of attributes the number of tight conditions for that combination. The number of combination of attributes that must be considered depends on the number of attributes in the data set, as well as the order restriction on the selection conditions, if any.

For a given combination of attributes, the number of tight conditions will depend on the number of tuples, percentage of tuples that satisfy the outcome condition, and characteristics of the attributes. For example numeric attributes will often be the source of more tight conditions than non-numeric attributes, and attributes with more values in their domains will also often be the source of more tight conditions.

The number of calls that Build_COG will actually make to the procedure Insert_COG in Block 56 of FIG. 3 is equivalent to the number of tight selection conditions that satisfy the selection condition constraints. The execution time of Insert_COG and all the procedures called as the result of its execution will depend primarily on the number of conditions present in the COG. The number of conditions present in the COG will depend on the simplicity order and number of fringes chosen.

Some experimental results will be presented infra conducted on the Census Income data set (Table 3) using a Pentium 933 Mhz machine with 384 Megabytes of RAM. In the experiments the semi-equivalence relation used was that of Example 2.37, and the simplicity ordering was $\geq_{simpler2}$ from Example 2.18. Unless stated otherwise the number of fringes found was 2, and the order constraint was 1.

Figure 4:
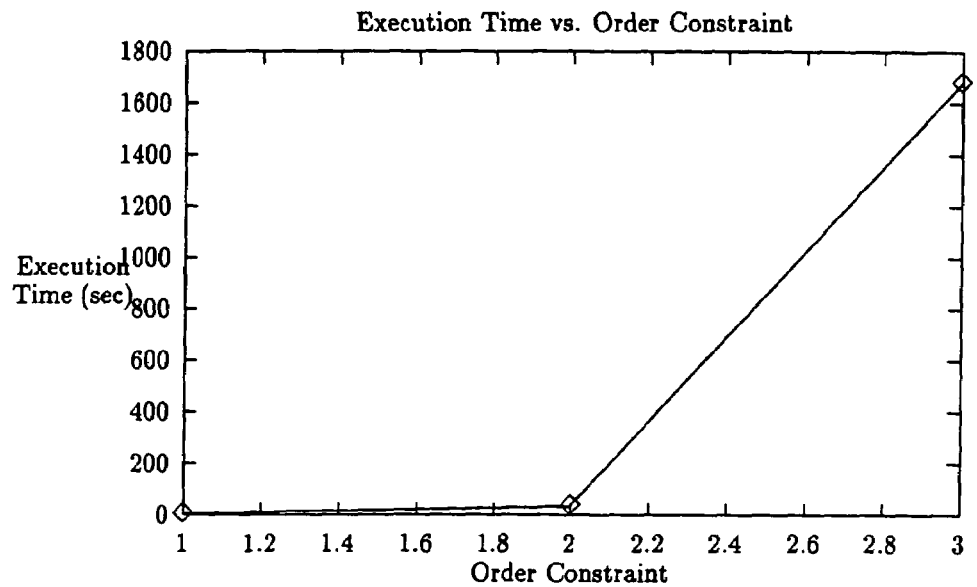
FIG. 4 is a diagram illustrating Execution Time of the procedure of the present invention vs. Order Constraint.

The plot of FIG. 4 shows execution time versus the order constraint. Since having an order constraint of three or greater can be extremely expensive computationally, the test was run on a 1000 tuple sample of the data set, and for this experiment only, age and hours-per-week values were rounded to the nearest multiple of 10. The plot of FIG. 4 indicates exponential growth in execution time, as the order constraint increases. Fortunately in many real-life situations conditions of low order are of more interest than conditions of higher order.

Figure 5:
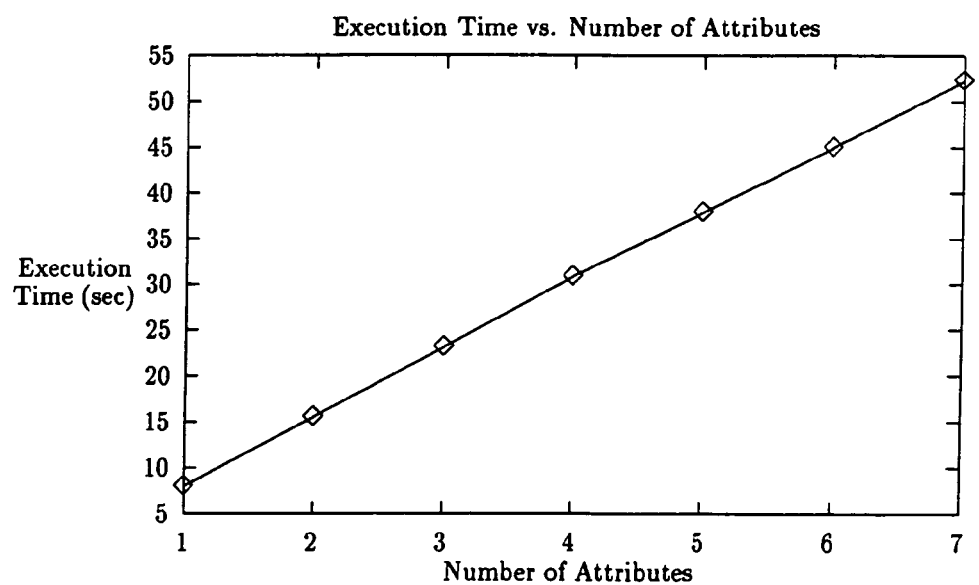
FIG. 5 is a diagram illustrating Execution Time of the procedure of the present invention vs. Number of Attributes.

The plot of FIG. 5 compares execution time of the procedure versus the number of attributes in the data set. The experiments were run on the unmodified 32,561 tuple data set. For control purposes only non-numeric attributes were included in the experiment. As expected, the increase in execution time was linear in the number of attributes, since the order constraint was 1.

Figure 6:
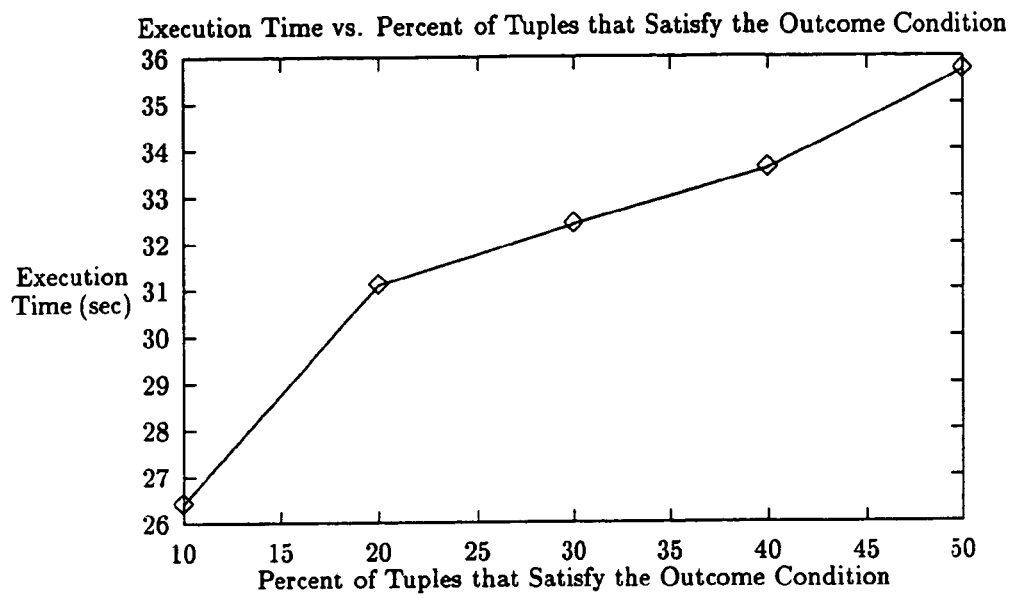
FIG. 6 is a diagram illustrating Execution Time of the procedure of the present invention vs. the present of tuples that satisfy the outcome condition.

The plot of FIG. 6 shows the results from an experiment conducted on five different 10,000 tuple samples of the data set. The percentage of tuples that satisfied the outcome condition was varied. In many applications domains, such as manufacturing, the percentage of tuples that satisfy the outcome condition of interest will generally be quite small, thus reducing execution time.

Figure 7:
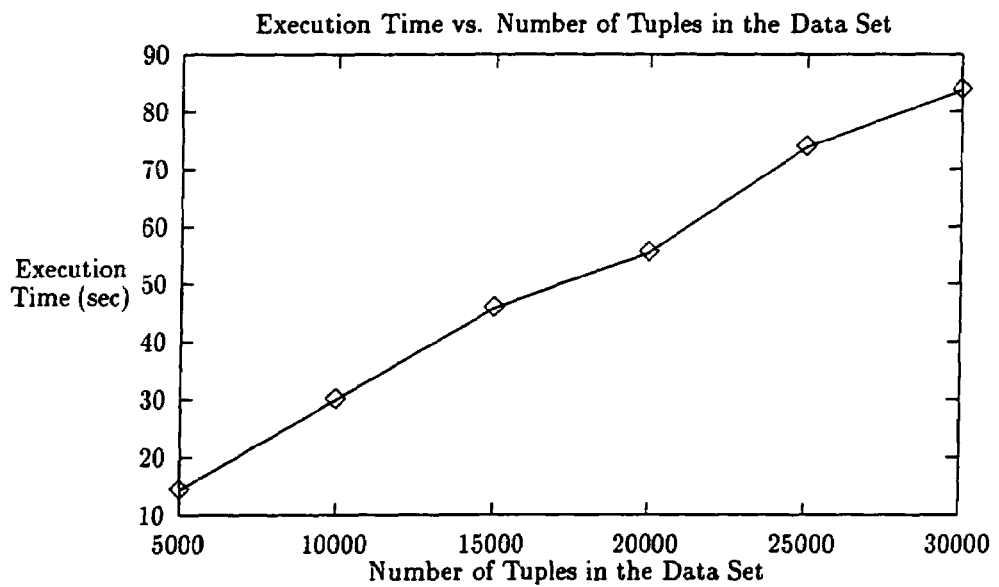
FIG. 7 is a diagram illustrating Execution Time of the process of the present invention vs. Number of Tuples in the Data Set; and, FIG. 8 is a diagram representing Execution Time of the process of the present invention vs. Number of Fringes.

The plot of FIG. 7 shows the growth in execution time as the number of tuples in the data set was increased. The increase in execution time as the number of tuples increase, can be partially explained by the increase in the number of tight conditions. Also an increase in the number of tuples causes the evaluation of the support and confidence of conditions to take longer.

Figure 8:
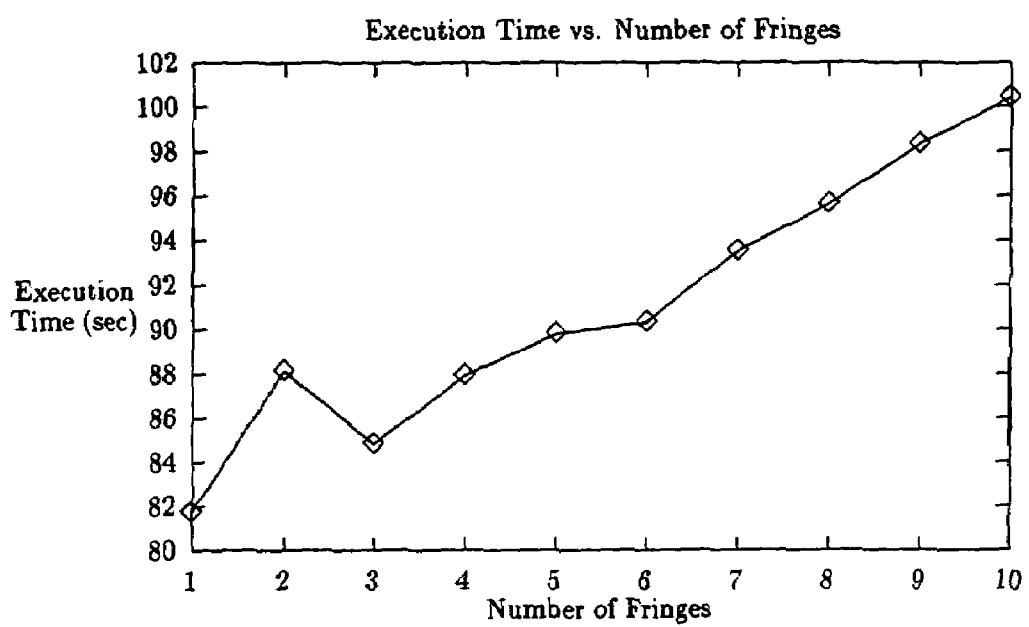

The graph of FIG. 8 illustrates execution time versus the number of fringes. The plot of FIG. 8 shows that increasing the number of fringes will generally increase execution time, though the increase is relatively small.

Although this invention has been described in connection with specific forms and embodiments thereof, it will be appreciated that various modifications other than those discussed above may be resorted to without departing from the spirit or scope of the invention as defined in the appended claims. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A method for finding an optimal set of data association rules in automated data diagnosis of the data characterizing an entity, comprising the steps of:

establishing a computer system for automated data diagnoses;

creating in said computer system a relation R containing the data A=($A_1, \ldots, A_n, A_{n+1}, \ldots A_{n+m}$), where n, m≧1, said data characterizing the entity to be diagnosed, said data being represented by outcome attributes $A_{n+1}, \ldots A_{n+m}$ and by diagnosable attributes $A_1, \ldots A_n$, said outcome attributes determining whether the entity is desirable or not, and said diagnosable attributes determining the reason of why the entity is desirable or not;

specifying a selection outcome condition (D) determined by a user which includes strictly outcome attributes selected from said $A_{n+1}, \ldots A_{n+m}$ attributes;

specifying at least one diagnosable selection condition (C) which includes diagnosable attributes selected by the user from said $A_1, \ldots A_n$ attributes;

specifying selection condition constraints (S) for said diagnosable selection conditions to meet, said selection condition constraints (S) including minimal acceptable confidence conf(c), minimal acceptance support sup(c) and maximum order of said diagnosable selection condition;

specifying a number of fringes of interest, $F^0, F^1 \ldots F^i, F^{i+1}$, wherein $$F^0 = \{C \mid up(C) = 0\}$$

$$F^{i+1} = \left\{ C \mid up(C) \subseteq \bigcup_{j \leq i \wedge C' \in F^j} \right\}$$

and wherein the fringe $F^0$ represents an optimal set of selection conditions with regard to a combination of respective ones of said specified support, said specified confidence and said specified simpler-than ordering, the fringe $F^1$, represents the set of diagnosable selection conditions that are less desirable than the fringe $F^0$, and the fringe $F^{i+1}$ represents the set of diagnosable selection conditions that are less desirable than fringe $F^i$;

computing said optimal fringes $F^0, F^1, \ldots F^i, F^{i+1}$;

computing a compact set of said optimal fringes to eliminate redundant conditions, said compact set representing the optimal set of data association rules; and storing said compact set of said optimal fringes in a memory of said computer system for retrieval.

2. The method of claim 1, further comprising the steps of:

specifying a simpler-than ordering ($\geq$simpler), including a set of said diagnosable selection conditions (C) which are simpler than a predetermined diagnosable selection condition;

specifying a Data Diagnosis Objective (DDO) by defining components thereof including:
(a) evaluation domain (ED) providing for measurement of quality of said diagnosable selection conditions,
(b) a partial ordering ($\subseteq$) of said evaluation domain, specifying which diagnosable selection condition in said evaluation domain are better than others, and
(c) a mapping function (f) that maps said diagnosable selection conditions to said evaluation domain, such that $C_1 > C_2 \Rightarrow f(C_2) \subseteq f(C_1)$,
wherein $C_1$ and $C_2$ are diagnosable selection conditions; and specifying a semi-equivalent relation ($\Delta$), on said diagnosable selection conditions to determine similarity thereof.

3. The method of claim 2, further comprising the step of combining said diagnosable conditions C to form a diagnosable selection condition SC.

4. The method of claim 3, further comprising the step of restricting said diagnosable selection conditions to tight diagnosable selection conditions T, wherein said diagnosable selection condition SC is tight if for each diagnosable condition $l \leq A_i \leq u$ in said diagnosable selection condition SC, $(\sigma_{(A_i=l) \wedge SC \wedge D}(R) \neq 0) \wedge (\sigma_{(A_i=u) \wedge SC \wedge D}(R) \neq 0)$ where $\sigma$ is a relational selection operator, and wherein $A_i$ is a diagnosable attribute, and l, u, $\in$ dom($A_1$) are values defined by the user.

5. The method of claim 4, wherein said step of computing said optimal fringes further comprises the steps of:

creating a condition graph by enumerating a set of tight selection conditions T satisfying said selection condition constraints S, and evaluating support and confidence defined by the user.

6. The method of claim 4, wherein if l=u, then $A_i$=l.

7. The method of claim 4, wherein l=u if said $A_i$ is a non-numeric diagnosable attribute.

8. The method of claim 4, wherein said $l \leq A_i \leq v$ is a diagnosable selection condition.

9. The method of claim 4, wherein if $C_1$ and $C_2$ are diagnosable conditions, then $C_1 \wedge C_2$ is a diagnosable selection condition.

10. The method of claim 4, wherein the confidence conf(c) of said diagnosable condition C is defined as $$\text{conf}(C) = \frac{card(\sigma_{C \wedge D}(R))}{card(\sigma_C(R))}.$$

11. The method of claim 4, wherein said support sup(c) of said diagnosable condition C is defined as $$\text{sup}(C) = card(\sigma_C \wedge_D(R)).$$

12. The method of claim 2, wherein said simpler-than ordering is defined as:
(a) $C_1$ simpler $C_2$ if each diagnosable attribute occurring in $C_1$ also occurs in $C_2$; or
(b) $C_1 \geq$ simpler$_2$ $C_2$ if $C_1$ has the same or fewer distinct attributes occurring in said $C_1$, than in said $C_2$; or
(c) $C_1 \geq$ simpler$_3$ $C_2$ if said $C_1$ has fewer distinct attributes than said $C_2$, or said $C_1$ has the same number of distinct attributes as $C_2$ but fewer numeric diagnosable attributes.

13. The method of claim 2, further comprising the steps of:

applying standard metrics to said DDO for comparing diagnosable selection conditions including either from a group thereof, consisting of: chi-squared value, confidence, conviction, entropy gain, loplace, lift, gain, gini, and support.

14. The method of claim 2, wherein said fringes are defined independent of said DDO.

15. The method of claim 14, further comprising the step of applying a plurality of distinct said DDO to said set of fringes avoiding recomputing said set of fringes.

16. The method of claim 2, wherein said semi-equivalence relations $\Delta$ is a distance-based semi-equivalence relation.

17. The method of claim 2, wherein said semi-equivalence relation $\Delta$ is an attribute distance threshold based semi-equivalence relation, the method further comprising the steps of:

defining $L_{CA}$ and $U_{CA}$ to be the lower and upper bounds, respectively, of a respective diagnosable attribute A in said diagnosable condition C, and defining a diagnosable selective condition $C_1$, as semi-equivalent to a diagnosable selective condition $C_2$ if:
a. the set of diagnosable attributes appearing in said $C_1$ is equivalent to the set of diagnosable attributes appearing in said $C_2$,
b. for each numeric diagnosable attribute, A, appearing in said $C_1$ and said $C_2$ $$d(L_{C_{1_A}}, L_{C_{2_A}}) \leq \varepsilon A$$
$$d(U_{C_{1_A}}, U_{C_{2_A}}) \leq \varepsilon A,$$

where the $\epsilon_A$ values are constants that differ based on the diagnosable attribute A; and
c. for each non-numeric attribute A, appearing in $C_1$ and $C_2$, $$L_{C_{1_A}} = L_{C_{2_A}}.$$

18. The method of claim 2, further comprising the steps of:

defining a subset SF of said set F of the optimal fringes as said compact representation of said set F with regard to said $\Delta$, if:
a. for each diagnosable selective condition sc$\in$F, $\exists$sc'$\in$CF such that sc$\Delta$sc';
b. if sc$\in$F and sc$\notin$CF, then $\exists$sc'$\in$CF such that sc$\Delta$sc' $\wedge$ ($\neg$(f(sc')$\subseteq$f(sc)) $\vee$ (f(sc')=f(sc))); and
c. there is no strict subset CF' of CF satisfying said conditions (a) and (b).

19. The method of claim 1, wherein said entity is a product of a manufacturing process.

20. The method of claim 1, wherein said entity is a financial prediction process.

21. The method of claim 1, wherein said outcome attributes and said diagnosable attributes in said relation R include numeric or non-numeric attributes.

22. A system for automated data diagnosis, comprising:

a computer system;

means in said computer system for storing data characterizing an entity to be diagnosed, means for forming a relation R containing said data, said relation R containing the data $A=(A_1, \ldots, A_n, A_{n+1}, \ldots A_{n+m})$, where n, $m \geq 1$, the data being represented by outcome attributes $A_{n+1}, \ldots A_{n+m}$ and diagnosable attributes $A_1, \ldots A_n$, said outcome attributes determining whether the entity is desirable or not, and said diagnosable attributes determining the reason of why the entity is desirable or not;

an interface for bi-directional communication between a user and said computer system, the user inputting into said computer system a plurality of selective conditions through said interface;

means in said computer system for computing optimal data association rules for said data to be diagnosed, based on said selective conditions, said selective conditions being characterized in combination, by a confidence, support and simplicity of said selective conditions; and means in said computer system for storing said computed optimal data association rules.

* * * * *